United States Patent
Stringham

(10) Patent No.: US 7,600,125 B1
(45) Date of Patent: Oct. 6, 2009

(54) HASH-BASED DATA BLOCK PROCESSING WITH INTERMITTENTLY-CONNECTED SYSTEMS

(75) Inventor: Russell R. Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 873 days.

(21) Appl. No.: 11/119,449

(22) Filed: Apr. 29, 2005

Related U.S. Application Data

(63) Continuation-in-part of application No. 11/021,518, filed on Dec. 23, 2004.

(51) Int. Cl.
    G04L 9/32 (2006.01)
(52) U.S. Cl. ........................ 713/176; 380/229
(58) Field of Classification Search .............. 713/190, 713/161, 300, 164, 176; 709/224; 380/229
    See application file for complete search history.

(56) References Cited

U.S. PATENT DOCUMENTS

| | | | | |
|---|---|---|---|---|
| 5,913,036 A | * | 6/1999 | Brownmiller et al. | 709/224 |
| 6,859,829 B1 | * | 2/2005 | Parupudi et al. | 709/224 |
| 7,073,064 B1 | * | 7/2006 | Angelo et al. | 713/176 |
| 2001/0034839 A1 | * | 10/2001 | Karjoth et al. | 713/190 |
| 2002/0083317 A1 | * | 6/2002 | Ohta et al. | 713/161 |
| 2005/0132241 A1 | * | 6/2005 | Curt et al. | 713/300 |
| 2005/0182929 A1 | * | 8/2005 | Kaniyar et al. | 713/164 |

OTHER PUBLICATIONS

John Kubiatowicz; an architecture for global-scale persistent storage; Year of Publication: 2000; University of California, Berkeley ; vol. 28, Issue 5; pp. 190-201.*

Cox et al., "Pastiche: Making Backup Cheap and Easy," 5th Symposium on Operating Systems Design and Implementation, 2002, University of Michigan, Ann Arbor, MI.

Clarke, "The Design of MSync," http://jamesclarke.info/projects/MSync/Design, Jan. 3, 2005.

* cited by examiner

*Primary Examiner*—Kambiz Zand
*Assistant Examiner*—Monjour Rahim
(74) *Attorney, Agent, or Firm*—AdvantEdge Law Group

(57) ABSTRACT

Methods are provided for detecting the processing status of data blocks in systems having intermittent connections. A hash value is used at times in place of a block's data content, thereby reducing processing of the block. Hash values may be maintained locally. Blocks collected locally may be stored locally at least until a connection to a server becomes available again. Systems and configured storage media are also provided.

24 Claims, 8 Drawing Sheets

HASH-BASED DATA BLOCK PROCESSING WITH INTERMITTENTLY-CONNECTED SYSTEMS

RELATED APPLICATIONS

The present application is a continuation-in-part of commonly owned copending application Ser. No. 11/021,518 filed Dec. 23, 2004.

FIELD OF INVENTION

The present invention relates generally to computer data processing, and more particularly relates to the use of hash values in data backup and in other data processing systems and methods.

BACKGROUND OF THE INVENTION

Computer data is often stored, generated, or otherwise organized in blocks. For instance, data is often transmitted in networks, or stored on disks and other nonvolatile media, in packets or sectors which have a fixed size. Each packet or each sector of data may then constitute a block. Sometimes packets or sectors are grouped into clusters to form blocks. At times, data is organized in blocks which are not necessarily multiples of a sector in size, particularly when data is created or manipulated in memory by software or I/O operations. Sometimes the blocks of interest are all the same size; sometimes they are not. Sometimes block size is constant for the duration of processing; sometimes it is not. Sometimes blocks are called by other names, e.g., sectors, clusters, packets, records, and so on.

Regardless, it is often useful to organize data in blocks in order to process such blocks individually. In some cases, blocks are used to organize data to help make a distinction between blocks that have been processed and blocks that have not been processed. In some cases, it is helpful to track the number of times (zero, one, two, and so on) that a given block has been processed. Sometimes it is useful to know whether two blocks contain the same data, so that the data itself can be processed exactly a certain number of times, or at least a certain number of times, or no more than a certain number of times, regardless of which block(s) contain that data.

One way to determine whether two equal-sized blocks contain the same data is to compare each byte (or bit) within one block to the corresponding byte (or bit) in the other block. In such comparisons, "corresponding" may mean "at the same offset from the start of the block" or it may have some other meaning, so long as the meaning is well-defined. But in addition to simply comparing the blocks' data, there are other ways to determine, with acceptable certainty, whether two blocks contain the same data. Examples are given later in this document.

Data processing may involve one or more operations of various types on data blocks. Some of the many possible examples of data processing include transmitting data blocks to another computer; sending data blocks to an I/O device such as a monitor or disk storage unit; comparing data block contents to other data; generating new data based on the given data blocks; using data to control movement, flow, temperature, pressure, sound, or other physical parameters outside the processing computer; transforming the data; and reorganizing data blocks and/or the data they contain. It may be useful in such processing to determine whether a given data block has been processed, and/or to determine whether data in one block is the same as data in another block.

The present invention provides certain combinations related to data processing. It is not necessary for every aspect of every inventive combination presented herein to be individually unknown prior to this presentation. Additional information about particular individual known features, precursors, and proposals preceding the present invention may be found elsewhere in the present application document and the application file. It is in this context, then, that the present invention is discussed.

BRIEF DESCRIPTION OF THE DRAWINGS

To help illustrate the present invention, a description of the invention will be given with reference to the attached drawings. These drawings only illustrate selected aspects of the invention. Features shown in the drawings are not necessarily required in every embodiment of the invention. Also, embodiments may include features that are adequately disclosed but not shown in detail in the drawings. In short, the drawings do not, by themselves, fully determine the invention's scope.

DETAILED DESCRIPTION

Figure 1:
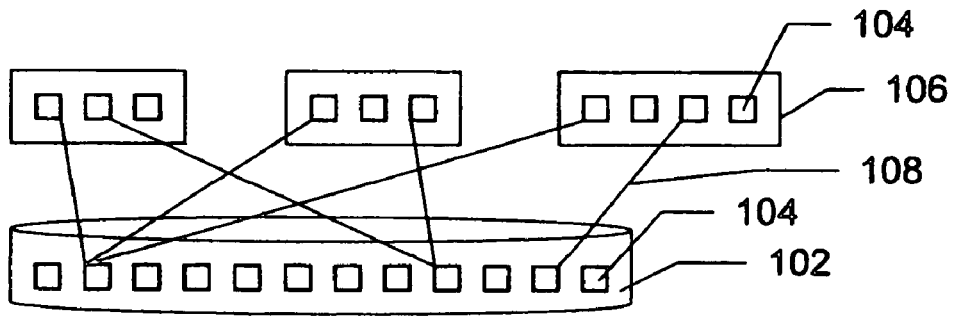
FIG. 1 is a diagram illustrating a cluster store which contains blocks.

In describing the invention, the meaning of important terms is clarified, so the claims must be read with careful attention to these clarifications. Specific examples are given to illustrate aspects of the invention, but those of skill in the relevant art(s) will understand that other examples may also fall within the meaning of the terms used, and within the scope of one or more claims. Words used herein do not necessarily have the same meaning they have in everyday usage, in dictionaries or treatises, in other publications, or elsewhere. Terms may be defined, either explicitly or implicitly, here in the Detailed Description and/or elsewhere in the application file.

As used herein, a "storage device" is a device that provides computer-readable non-volatile storage. Thus, "storage" refers to non-volatile storage. Examples include, without limitation, individual disks, RAID storage, and flash memory. A storage device is not necessarily limited to a single location. For example, mirrored disks separated by hundreds of kilometers may be viewed as a single storage device. Likewise, a "storage farm" having hundreds or even thousands of disks may be viewed as a single storage device if one is storing a relatively large amount of data, e.g., terabytes or more.

A "hash value" (also called a "hash") is a value calculated from digital data, which serves to distinguish that data from other data. A hash is relatively short compared to the data from which it is calculated. The word "hash" may also be used as a verb, meaning "to calculate or otherwise obtain a hash value". In this document "hash" includes at least creation of CRCs, other checksums, message digests, fingerprints, and other data summaries which require fewer bits than the data they summarize and which tend to change when the data is changed. A hash may be stored in a sole variable, a hash table, a balanced tree, a linked list, a record, a certificate, and/or another data structure.

"CRC" stands for Cyclic Redundancy Check, which is also sometimes referred to as a Cyclic Redundancy Checksum or a Cyclic Redundancy Code. A CRC is a hash. Not all hashes are CRCs.

An "intermittently-connected system" is any system that is frequently or routinely disconnected from a corporate network or other organizational network, e.g., a government agency's network. Mobile (laptop) users may well be the largest class of intermittently-connected users, but intermittent connections are also found in remote/home office locations, especially in third world countries where internet connections are slow and unreliable. In this document, use of the word "laptop" generally refers to any intermittently-connected machine, not merely ones having the physical dimensions or portability of a typical laptop.

Cluster Stores Generally

The present invention relates to processing data in blocks. As noted in the Background section above, the term "block" is broadly defined. One example of a block is a cluster. A "cluster" is a fixed-size block that is used as the allocation unit by some file systems, including without limitation many Microsoft Windows-brand file systems. On most Microsoft Windows XP-brand systems with the Microsoft NTFS-brand file system, for instance, the cluster size is typically 4K. In the imaging/backup space of computer processing, the cluster size of a file system may be a convenient size to use as the block size for imaging, mirroring, replication, archiving, retrieving, comparing, recovering, and other processing.

"Processing" is used in a broad sense in this document, to include any set of one or more operations performed by software and/or hardware on digital data, or operations producing digital data as a result. One example of processing is backing up clusters of digital data, from one part of a computing device to another part of that device, and/or to another computing device. For purposes of backing up data, a storage device is considered to be a computing device, even if its operations are limited to I/O operations.

To increase understanding of the present invention, we now consider various types of cluster stores as examples of processing data in blocks. A "cluster store" is a way of compressing data by identifying identical blocks of data, and storing each unique block exactly one time. This technology may also be referred to as a "single instance cluster store" (SICS).

FIG. 1 illustrates single instance cluster stores in general. A storage device 102 contains copies of blocks 104 of data. The data is backed up to the storage 102 from one or more data sources 106, such as individual computers or individual image files. Some correspondence 108 exists so that a full sequence of blocks 104 representing a given data source 106 can be restored or replicated if need be. The diagram in FIG. 1 does not show every such correspondence 108. However, it does show multiple source blocks in correspondence with a single stored block, to emphasize the purpose and nature of a SICS, which is to reduce storage requirements by reducing storage of redundant data.

In some situations using many computers, such as in enterprises or Original Equipment Manufacturer (OEM) configuration factories, duplicate blocks are quite common in the data one works with. As the same computers within a given organization are backed up again and again, for instance, it often happens that much of the data is unchanged and that the backup duplicates data blocks that have previously been stored. For example, it is often true that most of the computers in an organization contain the same OS, running on a small number of hardware platforms, so that many have the same device drivers. An application installed on one computer in the organization is very likely to be installed on others, and quite possibly on all other computers in the organization. A document created by one person is often shared with others and copied to their computers. When an upgrade or patch is installed on one computer, it goes out to many. Thus, there is often a large amount of duplicate data between the computers in an organization. A SICS for this organization will identify all of this redundancy and only store a single instance as part of the backup, so that a full backup of the entire organization may not be much larger than the backup of a single computer.

Incremental images attempt to reduce such redundancy by only capturing newly written disk sectors or clusters, but they still often include much duplicate data. One common reason for redundancy in incremental images is the re-arranging of clusters by disk defragmentation programs. Duplicate blocks can also come from programs such as word processors that don't save new versions of a data file over the top of the existing file, but rather create a new copy and delete the original file only if this new file creation is successful; this relocates data that is often largely unchanged or only appended to. Another limitation with incremental images is that it is usually impractical to take incremental images forever; periodically one must take another base image.

Single instance cluster store technology identifies duplicate blocks, regardless of where they occur or how long it has been since one was previously seen. As a result, over time a single instance cluster store can be much more space-efficient than a base image with incrementals. This is especially likely if one wants access to all previous backups.

A key to single instance cluster store technology is efficiently identifying duplicate blocks. This identification may be done in various ways.

Cluster Stores Using a Short Hash with Index

More than one year prior to the earliest priority date of this patent document, a team at PowerQuest, including the present inventor, designed and prototyped a particular type of SICS for a potential OEM customer, Dell Incorporated. This led to the filing of confidential U.S. provisional patent application Ser. No. 60/336,214 filed Nov. 2, 2001 for Computer Data Delta Imaging Tools and Techniques ("the '214 provisional"), which is incorporated herein in its entirety by reference. The section titled "Image Store Variant", which is found on pages 2-4 of the '214 provisional, may be of particular interest. Other PowerQuest patent applications and PowerQuest patents are also identified in the '214 provisional, including U.S. application Ser. No. 09/532,223 (now U.S. Pat. No. 6,615,365), U.S. application Ser. No. 09/810,874, U.S. application Ser. No. 09/942,234, U.S. Pat. No. 6,615,365, U.S. Pat. No. 6,253,300 and U.S. Pat. No. 6,108,697. Symantec Corporation is not mentioned, as the '214 provisional was filed prior to the December 2003 acquisition of PowerQuest by Symantec, but Symantec's Ghost-brand imaging software is mentioned.

The OEM had a large set of similar images that were being installed on machines on a factory floor. The PowerQuest design effort had two main goals. One was to reduce the amount of space required to store all of these images. The other goal was to reduce the bandwidth required to duplicate new images between factories.

Figure 2:
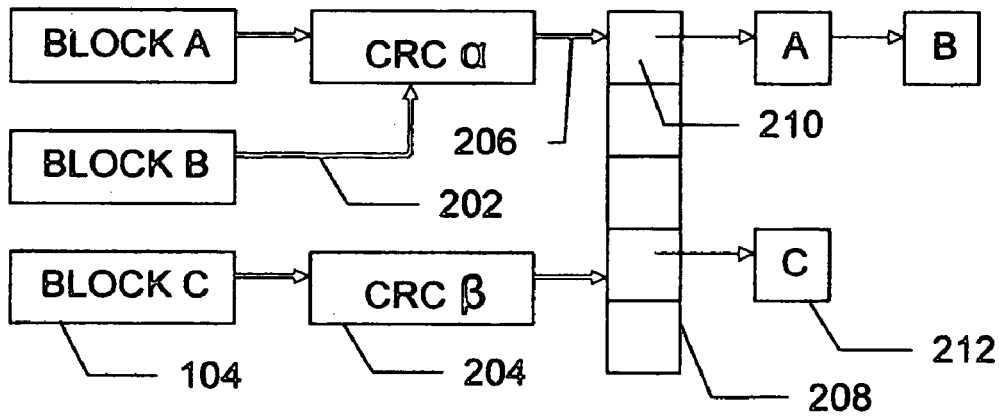
FIG. 2 is a diagram illustrating a CRC-based approach to determining whether blocks have been added to a cluster store.
Figure 4:
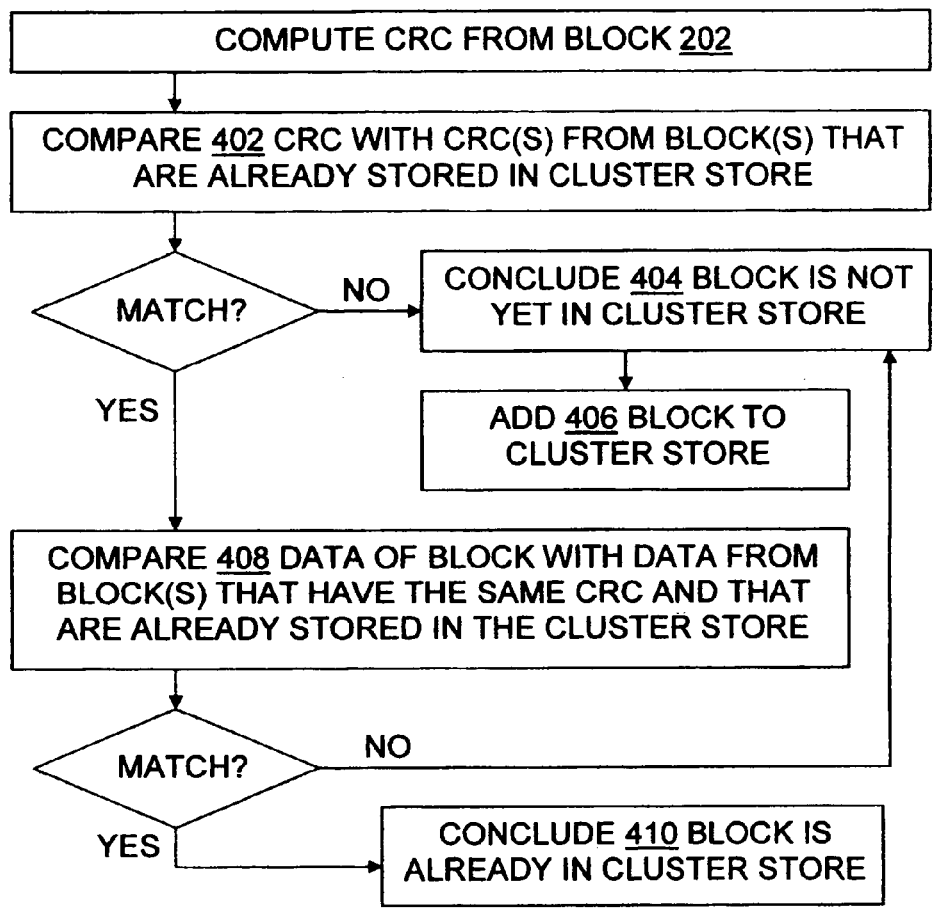
FIG. 4 is a flowchart further illustrating a CRC-based approach to determining whether blocks have been added to a cluster store.

As illustrated in FIGS. 2 and 4, this design used a particular algorithm for identifying duplicate blocks 104. The algorithm involves computing 202 a CRC value 204 for each new block of data, and then comparing 402 that CRC to the CRC values of blocks already in the SICS. If the CRC is unique (as with block C in FIG. 2), then the algorithm concludes 404 that this is a unique block which must be added 406 to the SICS. If the CRC is not unique (as with blocks A and B in FIG. 2), then for each block in the SICS with this CRC, the data bytes are compared 408 to the new data block to see if they match. If it is a unique block, it is added to the end of the SICS data file, but if the data matches, the algorithm concludes 410 that the block is already in the SICS. This approach is called the "Short Hash with Index" (SHI) approach to cluster stores. The present invention can also use CRCs, but differs in other respects from the early design effort.

FIG. 2 illustrates a situation in which three blocks 104 each contain different data, but two of the blocks have data that hashes to the same value (CRC alpha). The CRC values 204 point 206 into a hash table 208, which contains linked lists 210 of offsets 212 into the SICS storage 102. Other hash table implementations may also be used, such as one in which offsets matching blocks whose hashes collide are stored in successive array entries rather than linked lists. The particular hash data structure used is not as important as the fact that collisions can occur, and the fact that they are resolved by comparing the actual data stored in blocks whose hash values collide.

In a SHI design, the hash table structures can be implemented to allow a list of all of the CRC values (at least) to reside in memory, so that checking a new block only has to go to disk if the CRCs match. Thus, if there is a CRC match, one disk read may be all that is needed to determine that it is a duplicate, and if the CRC does not match then one disk write adds it to the SICS, so each block can be processed with a single I/O call on average.

The CRC space can be designed to be large enough so that the majority of the time that a CRC matches, the data also matches. For instance, consider a CRC size of 32 bits. As a rough estimate, 32 bits allows space in the SICS for about 2^32 blocks of 4K bytes each, representing 2^32*4K=2^44 bytes or about 16 thousand gigabytes of data, ignoring hash collisions. A CRC size of 40 bits would provide even more storage capacity and/or even fewer CRC collisions that require comparison of the actual data (as opposed to comparison of different CRCs based on the data).

Figure 5:
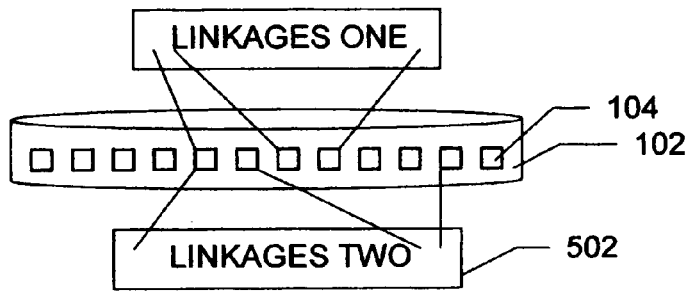
FIG. 5 is a diagram illustrating linkage files which define images as ordered sequences of offsets into a cluster store.

In a particular design, an image file is simply an ordered set of blocks, represented by a linkage file. FIG. 5 illustrates two linkage files 502, each of which is an ordered set of references to blocks 104 in a SICS 102. Blocks are identified within the SICS by their index or offset within the SICS data file. These indexes could be 32-bit or 40-bit values, for instance, depending on the size of the SICS.

Often when a new block of data is added to the SICS, it comes from a new application or data set and many of the following blocks will also need to be added. This creates a large run of sequential indexes that can be stored very efficiently, e.g., by specifying an initial offset and the number of following consecutive offsets in the run. Also, the next time that this application or data set is seen, the blocks are usually in the same order, so again one gets a large run of sequential indexes. As a result, the linkage file can sometimes be very compact, such as $\frac{1}{10,000}^{th}$ the size of the original data, or even less.

Once data is added to this SICS, it is never modified. New data is always added to the end. Because of this, when a new image is added to the SICS, it can be replicated to another site (e.g., another factory) quite easily, by merely transferring the linkage file, and transferring any new data added to the end of the SICS, which is typically much smaller than transferring a full image.

One of the limitations of this SHI SICS design is that it is difficult to remove obsolete data when it is no longer needed. When an image or a set of images becomes obsolete (because of the release of a new operating system, for example), the obsolete blocks in the SHI SICS cannot be re-used. Re-use would interfere with replication—a data block would no longer be uniquely identified by an offset, since a given offset would be used to identify different data blocks at different times. Timestamps, version numbers, or other means could be used to determine which block contents are intended by a particular use of an offset, but recourse to comparison of actual data in response to CRC collisions would still be used with these alternatives.

Cluster Stores Using a Unique Hash

After the PowerQuest SHI work, Sean Quinlan and Sean Dorward of Bell Labs published a paper on a file system they designed for archival storage, titled "Venti: a new approach to archival storage". This and other papers discussed herein can be found online or, in due course, in the public record of the present application file. The Venti paper's approach, as adapted for use in a SICS, is called here the "Unique Hash" (UH) approach to cluster stores.

The Venti paper describes an approach that is similar to a SHI SICS in that it identifies unique blocks and stores only a single copy, and ideas in the Venti paper may be adaptable for use in a SICS. The Venti paper also suggests taking linkage data, breaking it into blocks, and storing these blocks in the archive (e.g., SICS) as well, so that only a single archive reference is needed to reconstruct a full system backup.

However, there are also some significant differences between the Venti design and the PowerQuest SHI SICS design. In particular, there are differences in the way that each approach detects unique blocks (blocks having different data content), and in the way that each references the stored blocks.

Figure 3:
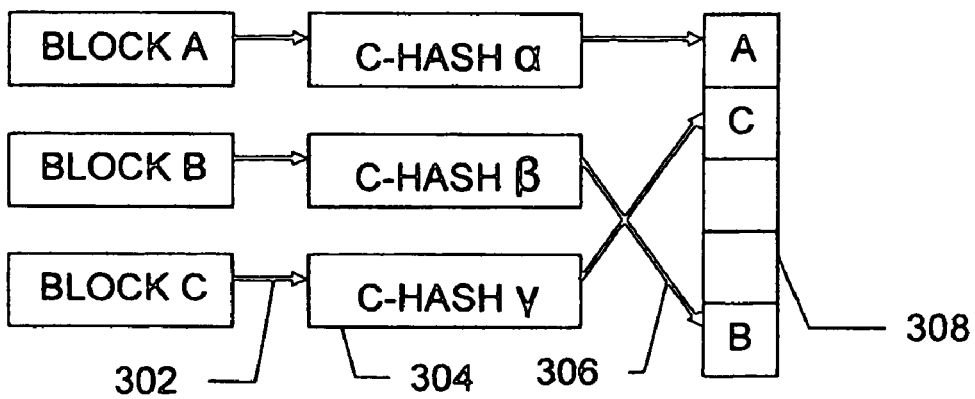
FIG. 3 is a diagram illustrating a cryptographically-strong-hash-based approach to determining whether blocks have been added to a cluster store.
Figure 6:
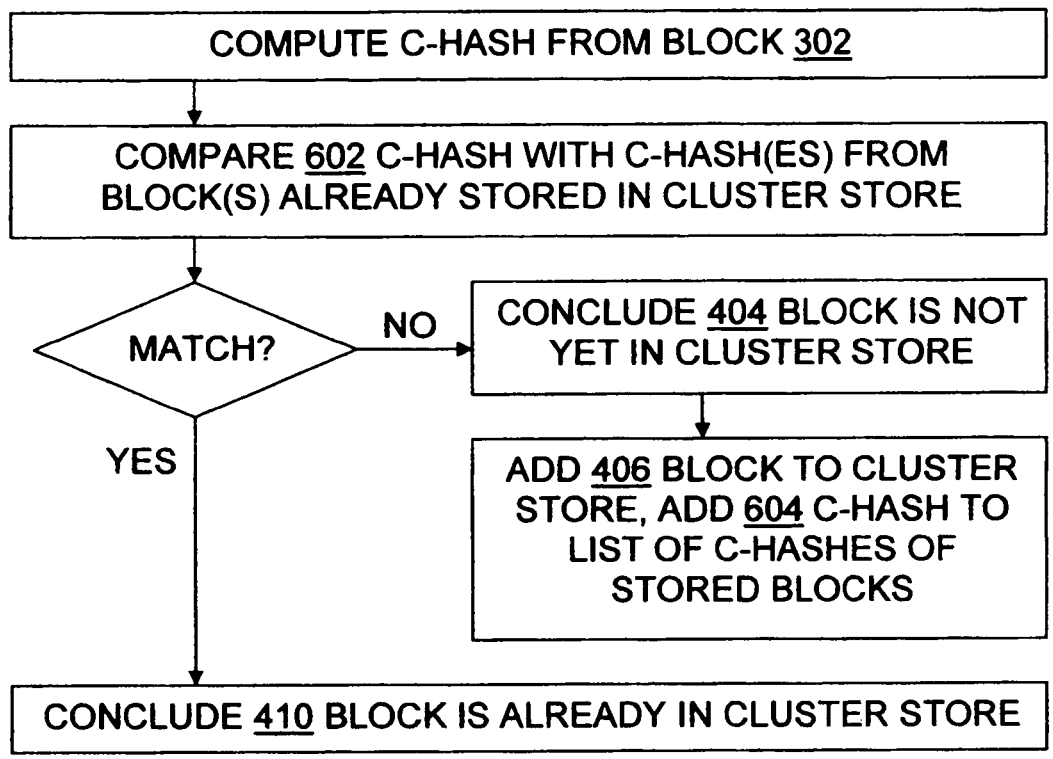
FIG. 6 is a flowchart further illustrating a cryptographically-strong-hash-based approach to determining whether blocks have been added to a cluster store.

As illustrated in FIGS. 3 and 6, the UH approach uses a cryptographic-ally strong, collision-resistant hash function to uniquely determine if two blocks of data match. With a cryptographically strong hash algorithm, given any block of data, it is understood to be computationally impossible (in our lifetime) to find another block of data that has the same hash value. Thus, under UH if we see that two blocks of data have the same hash value, they are treated as having the same content.

Blocks are cryptographically hashed 302 to produce cryptographically strong hash values 304, which are used to index 306 into a table 308 of block locations in SICS storage 102. In the illustrated situation of FIG. 3 there are no collisions; each block produces a different hash value, unlike the SHI approach.

In their paper, Quinlan and Dorward state the probability p of a collision as:

$$p \leq n(n-1)/2^b$$

where n is the number of unique blocks in the archive (the SICS, in our case) and b is the number of bits in the hash value. UH under the Venti approach uses the Secure Hash Algorithm (SHA-1) developed by the United States National Institute of Standards and Technology. This hash algorithm produces a 160-bit (20 byte) hash value. For an exabyte of unique data (one million terabytes) using 4K blocks, this makes $n=2^{60-12}$. Thus, under formula 1 above, the probability of a collision with an exabyte of unique data is less than $\frac{1}{2}^{64}$ (i.e. $2^{48}*2^{48}/160$), or one in sixteen million trillion. If the unique data size is more on the order of a terabyte (which is more typical for a SICS meeting today's requirements), then one adds nine zeros to the above number (one in a million billion trillion).

After UH computes 302 the hash of a new block 104, it compares 602 the hash value just computed with hash values of blocks already stored in the SICS. If none match, it concludes 404 that the block has not yet been placed in the SICS, so it adds the block to the store 102 and adds 604 the hash to the hash table. (Although not shown, the SHI algorithm similarly adds CRCs to the set of CRCs representing stored blocks when it determines the CRC'd block needs to be added to the SICS.) If the UH approach finds that the hash value already occurs for a block within the SICS, then unlike SHI, it does not do a byte for byte compare of the blocks. Instead, UH simply assumes 410 that they are the same. That is, UH assumes that two blocks which have the same hash necessarily also have the same underlying data on which computation of the hash value was based. This may seem unsafe, but the odds above suggest it should be safe.

However, even with this extremely low probability, not all researchers are convinced that this is a safe thing to do with user data. A skeptic's overview can be found in an online posting by Val Henson of Sun Microsystems, titled "An Analysis of compare-by-hash", which is available at the Usenix dot org site and elsewhere. In particular, Henson argues that "rsync is an appropriate use of compare-by-hash, whereas LBFS, Venti, Pastiche, and Stanford's virtual machine migration are not."

Avoiding the comparison reduces I/O on inserts of block data into a UH SICS. However, because the hash values are larger (about four times the size of SHI hashes), it is less likely with UH that the whole hash table can be held in memory on a system, so I/O may be required to access the hash as part of detecting duplicates. Therefore, adding new data to the SICS using the UH algorithm is approximately equivalent to slightly more expensive than with the SHI algorithm (as long as the SHI algorithm's hash table can fit in memory). The computation of the SHA-1 value 304 also requires significantly more CPU time than computation of the CRC used by SHI.

Figure 7:
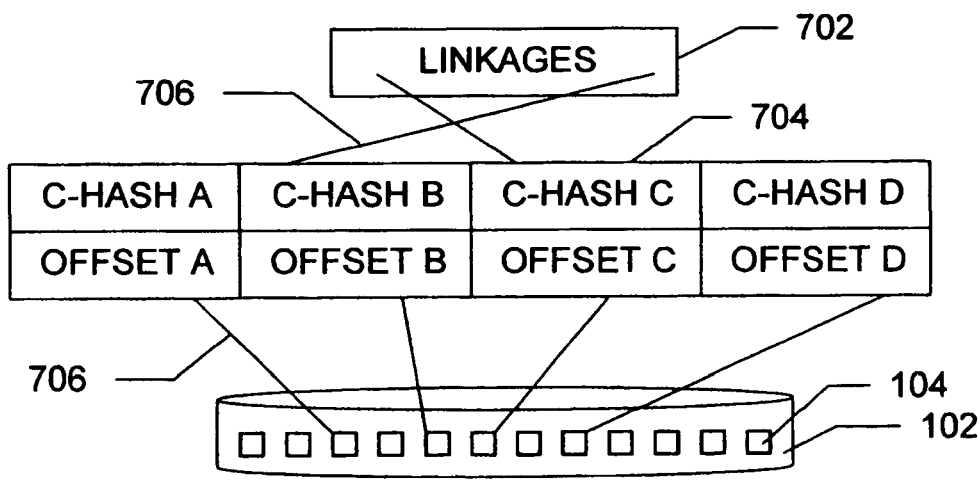
FIG. 7 is a diagram illustrating a linkage file which defines an image as an ordered sequence of cryptographically-strong-hash values, which correspond in turn to offsets into a cluster store.

As illustrated in FIG. 7, a linkage file 702 in UH can also differ from an SHI linkage file. Rather than storing a block's index into the SICS data file, UH stores its unique hash value; linkage files include an ordered sequence of hash values 304. Accessing the data 104 involves using a hash table 704 to map 706 a specific hash value back to its corresponding data in the SICS. This allows one to check that the data pulled out matches what was put in, because it should hash to the same value. Moreover, if the data in the SICS is rearranged (such as by removing obsolete data), the linkage data is still valid, although the table 704 must be updated with new offsets.

However, UH also has two substantial costs. First, the linkage data now consists primarily or exclusively of hash values that are about four times bigger than the corresponding indexes and they don't compress at all, so the linkage file is often fifty times larger than the SHI linkage file ($\frac{1}{200}^{th}$ the size of the data versus $\frac{1}{10,000}^{th}$). Second, a hash table is required to restore data. If the hash table does not fit in memory, each block read from the SICS requires two or more I/O operations rather than the single I/O required by the SHI algorithm, which can directly access the data via its index.

Cluster Stores Using a Unique Hash with Index

With an understanding of the SHI and UH algorithms, one can also envision a modification to the UH algorithm which substitutes indexes for the hash values used as references. That is, the linkage file resembles FIG. 5 rather than FIG. 7, even though the procedures for adding blocks to the SICS correspond with FIG. 6 rather than FIG. 4. This approach would allow the linkage data to be identical to the SHI algorithm with the reduced memory and I/O for restoring data, since the hash table would no longer be needed for the restore. This approach is called Unique Hash with Index (UHI).

Building on What was Learned with Cluster Stores

With an understanding of the invention, one can build in various ways on the resources, processes, experiences, and other attributes gained by way of SHI and UH cluster stores. One such possibility is UHI cluster stores. Other possibilities in the backup/imaging arena include use of SHI, UH, or UHI for improved efficient replication, primary/secondary backup locations, reducing network bandwidth of backups, and/or data management and analysis. Another set of possibilities relates to improvements to the use of hashes (CRCs, C-hashes, or otherwise) for detecting blocks whose data has already been stored in a cluster store, or replicated, or transmitted over a network, and so on. Yet another set of possibilities arises from the realization that other types of block-oriented data processing, which are not necessarily in the backup/imaging arena, can use hashes to detect processed blocks. It will also become apparent that these various possibilities may overlap or complement one another in some situations.

We now explore in more detail some examples of these possibilities. The scope of the present invention is not limited to these particular examples. Examples are provided to enhance understanding, not to implicitly exclude other embodiments of the invention.

Networked Cluster Stores with Superblock Hash A SICS can be designed for use on (or otherwise within control of) a server. The server SICS allows one to consolidate data (e.g., disk images) from multiple systems into a single, more efficient storage archive. In particular, in a configuration like the one illustrated in FIG. 12, a UH approach or a UHI approach can be used with a status determiner 1202 to determine which blocks 104 have been transferred from a client 1204 across a network 1206 to a server 1208 to be placed in a SICS storage 102 that is managed by the server. The status determiner 1202 can be implemented using software 1406 to configure general-purpose computing hardware, firmware, and/or ASICs, PALs, FPGAs, or other special-purpose hardware.

In some embodiments implementing a UH or UHI SICS across a network 1206, hash values 1210 are first sent from a client machine 1204 to the SICS server 1208. (The hash values are designated 1210 in FIG. 12 because they may be cryptographically strong hash values 304, as in UH/UHI embodiments, or they may be other hash values in other embodiments.) If the SICS server 1208 indicates that clusters (blocks 104) with the hash values are already present in the SICS' set 1212 of processed (stored) blocks' hash values, then the corresponding data blocks 104 do not need to be sent from the client to the server. Assuming 4K data blocks and 160-bit (20 byte) hash values, this results in about a 200-times reduction in network bandwidth usage.

However, there is a very slim possibility that two different data blocks could share the same hash value, even in a UH/UHI system, as discussed above and noted in the online article by Val Henson. If one of these equal-hashing blocks 104 is already in the server SICS, and the client contains an instance of the other one, then the UH/UHI algorithm will incorrectly say that they are the same, and will not store a copy of the client's block in the server SICS. The backup of the client 1204 into the server SICS will actually be corrupt, but this fact may not be detected or become apparent until much later.

Using superblocks and other tools, the present invention provides systems and methods for detecting that a hash collision has occurred, so that the collision can be handled in an appropriate way, such as by backing up the client's block. Note that if we want to deal with the case where multiple blocks may have identical hashes, then we cannot use the same UH algorithm described earlier in this document, because it assumes that a hash value uniquely identifies a data block. The previously described UHI and UH algorithms (at least) can be modified to handle this, as follows, with reference being made to FIGS. 12-14 for examples.

As a given client 1204 checks hash values 1210 against the SICS set of hash values 1212, if the hash for a given block doesn't match, the client sends that full block 104 to the server 1208. In the unmodified UH/UHI design, if the hash matches, one simply assumes the blocks are the same. But in some embodiments of the invention, this is modified, in that the client 1204 collects these "matching" blocks into a superblock 1402 of some number of blocks, such as 256 blocks, for example. The server 1208, knowing which hash values the client 1204 has attempted to match, pulls what are apparently these same blocks 104 from the SICS 102 into its own copy of the superblock. Whether the blocks are actually the same is the determination to be made, using comparison of superblock hashes.

When the superblock 1402 is full, both client and server compute a hash of their own superblock, and then one of them compares their respective hashes. If any of the data blocks in the client superblock differ from server's data blocks, then with SHA-1 as the hash algorithm, the probability that we won't detect the difference is about $2^{-160}$ (on top of the already small probability of not detecting it with the original hash). The increased network traffic for this is 160 bits per 256 blocks or less than one extra bit per block. With this algorithm we effectively get the error rate of a double SHA-1 algorithm (320 bits), but incur a penalty in network bandwidth of less than 1%. It also allows us to keep the hash table/b-tree the same size (160-bits). There is a small amount of additional overhead on the client to cache the superblock and compute its hash. There is a larger cost on the server, where the server process now needs to read each matched data block, doubling the amount of I/O (from the single I/O needed for the hash table). There is also now on the server the cost of computing each superblock's hash, where otherwise the server does not compute any hashes, thus significantly increasing its CPU usage.

Retrieval of blocks 104, hash computations, tracking of the number of blocks retrieved, transmittal of superblock hash values for comparison, and other superblock-related operations are performed by a superblock status determination module 1404 and/or by one or more other processing modules 1214. Processing modules may also serve administrative functions, such as profiling, notifying personnel, logging, and so forth.

Figure 13:
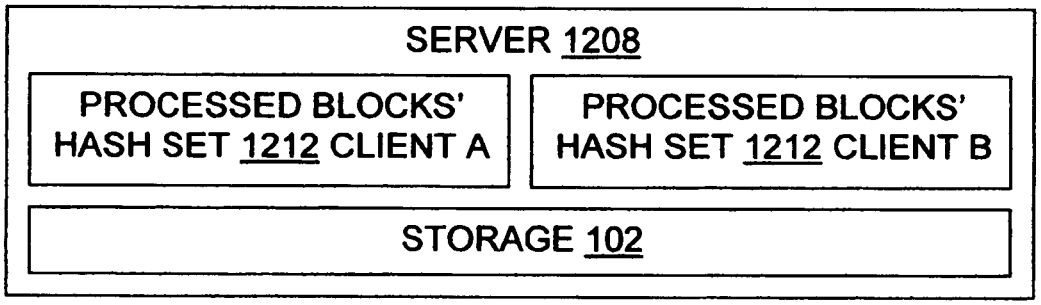
FIG. 13 is a diagram illustrating an alternate server configuration which may be used in some systems and methods that determine whether blocks have been processed.

Different embodiments may place particular functionality in different modules and/or at different locations. For example, in some embodiments the client sends hash values to the server and the comparison with processed block hash values is done on the server, whereas in other embodiments the server updates its clients with the current set 1212 of processed block hash values, and the hash comparison to detect unprocessed blocks occurs on the client. As another example, in some embodiments a single set of processed block hash values is maintained for all clients, while in other embodiments a distinct set 1212 is maintained for each individual client, as indicated in FIG. 13.

It may happen that one using the invention finishes a backup before the superblock is full. The embodiment should still calculate the superblock's hash. But in the case where the superblock contains only a single data block, the hash will be the same value as the original hash, and the embodiment as described thus far might not detect an error. One can work around this by adding 820 at least one extra block 1408 to the superblock, where the extra block 1408 contains one or more random values generated using a common seed value on both the client and the server. That is, in some embodiments, the step of calculating 822 a superblock-hash-value occurs after a data-block 1408 which contains generated random content is added 820 to the superblock.

Some embodiments generate a random block for each superblock. The random number generator for each superblock is seeded with the same initial value, so that each superblock will contain the same random data. As a result, if SHA-1 (or whatever hash function is used) is ever broken, the use 820-826 of client-server-coordinated random blocks 1408 thwarts the efforts of a wrongdoer to generate data that causes collisions without the collisions being detected, since the wrongdoer will not know the extra random value(s) of the superblock.

To further reduce the risk of an undetected collision, some embodiments may use different hash algorithms for block-processing and superblock-processing, such as SHA-1 for block processing and SHA-256 for superblock processing. Then if either algorithm is ever broken, the alternate algorithm will likely not be broken by the same pattern of data.

Taking the superblock idea one step further, some embodiments reduce the number of bytes of the SHA-1 value (for instance) used in the comparison for each data block. If we only use 128-bits of the 160-bit SHA-1 value for a block, then the chance of the 128-bit value falsely matching another block's 128-bit value is still very small, although it is larger than when using the full 160-bit values. However, by also using the superblock, the embodiment will detect if there are any false matches, in which case it can re-compare the individual data blocks using their full 160-bit SHA-1 values as the proxy for the actual data. The odds of a false match are still extremely small. However, this refinement reduces network bandwidth by an additional 20%, while still keeping the probability of not detecting a collision to about the equivalent of SHA-1 with 288 bits (160+128).

Another variation works as follows. For each data block compute its SHA-1 hash (for instance), then transform the data in some way and compute a second SHA-1 hash. The two hashes are combined into a 320-bit hash value, e.g., by abutting them or otherwise interleaving their bits, or by multiplying them. Using this larger hash value reduces the probability of an undetected collision by perhaps the same amount as the above algorithm. However, it does require increased computation, twice the network bandwidth, and a larger hash table. Then again, similar arguments could be made against stronger hash algorithms, such as SHA-256 or SHA-512.

Intermittent Systems

The present invention can provide tools and techniques for processing blocks in networks that include intermittently-connected computing devices. In particular, when processing includes backing up blocks to a repository to preserve data, the invention can help. For example, some embodiments provide laptop computers with the ability to get automatic, regular backups of their data regardless of whether they are connected to a LAN or WAN at the time backup is desired. SICS provided by some aspects of the invention make it practical for the user to access any data from any previous backup, including full system restores, when they are connected to the LAN/WAN. Some embodiments extend this to allow full access to backup data when they are not connected to the LAN/WAN. Some embodiments efficiently synchronize recent backups of the laptop with a permanent set of backups on a server; the laptop backups may have been made while the laptop was disconnected from the LAN/WAN. Some embodiments help keep storage requirements on the laptop to a minimum. Some embodiments allow backup of multiple systems across a network with reduced or even minimal network traffic, as opposed to other solutions. Some intermittent-system embodiments utilize superblocks, while others do not.

Some systems have a local hash table that is the only hash table (no corresponding server hash table) and focus on using that local hash table for block processing when the device with the local hash table is connected to the network. By contrast, some intermittent-systems have a local hash table that is the only hash table but focus on using that local hash table for block processing on a laptop when the laptop is not connected to the network, and on how to proceed when a connection is again made. Some systems have a local hash table that is a subset of a full hash table maintained on a server; of these, some focus on using that local hash table for block processing when the local system is connected to the network, while others focus on using the local hash table for block processing on a laptop (for instance) when it is not connected to the network, and on how to proceed when the laptop again connects to the network.

In particular, one embodiment does not require a server to determine which blocks have been processed. SICS data resides on a server 1208 but the hash tables 1212 reside solely on the client(s) 1204. Such a client 1204 can perform a backup while disconnect, saving 1510 the blocks locally until a connection is re-established and they can be transferred 1520 to the SICS. A server superblock is not required.

As another example, multiple clients backup to a single SICS that is managed by a server process. Each client 1204 has a local hash table that is a subset of the full hash table maintained by the server process. The local hash table on each client is used to reduce network and server load by eliminating the need to transfer the hash values for most blocks across the network; if the hash is in the local hash table, the server has already seen it. Therefore, the server process is only presented hash values that are new to the client. This means that it cannot compute a superblock for those blocks that the client identifies as already having been seen. However, if the client is saving its linkage data to the server, then the linkage data will either contain a full list of hash values (if SICS is UH) or the indexes of the blocks (UHI) and the server could use this data to compute superblock values. But if the linkage data is being saved on the server, then the local hash table provides little or no savings in network bandwidth.

In the case of UH without superblock, an intermittent-system which has local subset hash tables and linkage data saved to the server does significantly reduce the processing on the server versus not having a local hash table. But if superblocks are used then the server load is essentially identical, while we have significantly increased the client load for no benefit. In the case of UHI without superblock, it does significantly reduce the processing on the server as well as a substantially reduce the network traffic, but using superblocks means that the server load is only partially reduced, which may not justify the added load on each client.

As another example, consider an intermittent-system in which multiple clients 1204 backup to a common SICS managed by a server process, as discussed above, but the clients also backup to a local cache on the client when they are disconnected from the network. Then they 1204 sync this data with the server 1208 when they reconnect. If superblocks are not used, then this approach shows reduced network bandwidth and reduced server load. However, those advantages may not always be the highest priority. Some systems may focus on simply allowing disconnected backup utilizing a shared SICS, so using a superblock may be acceptable even if it increases bandwidth and increases the server 1208 load.

In one such superblock system, when the client 1204 finds a block that is already in its local hash table, it places the block into the superblock 1402. When the superblock is full, the client computes the superblock's hash. However, since the server is not online, the client cannot immediately compare this hash value to a superblock hash value computed on the server. It must therefore save this superblock hash value for later comparison, and proceed with the backup. The client may not have space to keep all of these superblocks around until it re-connects with the server, so it must discard some or all of them. When a network connection is re-established 1512 the client would send the linkage data to the server, which could use the linkage data to reconstruct the superblocks and compute their hashes. However, if a superblock hash computed by the server does not match one computed by the client, then the client may not be able to reconstruct its copy of the superblock to determine which block or blocks differ from those in the superblock of the server. The client can identify the sector or cluster corresponding to the blocks in the superblock and if they have not changed since the backup, then it can rebuild 1522 the superblock and proceed with normal superblock processing. The client can determine if a sector or cluster has changed by computing its hash and seeing if it has changed, comparing the current hash for the block to the one in the linkage file. However, if a block has changed, then the client cannot rebuild the superblock, so it must either treat the backup as bad, or at least treat the portion associated with this superblock as bad, and rebackup those blocks or take other action. Similar considerations apply to forms of block processing other than backing up blocks.

One way to keep all superblock data around while the client 1204 is disconnected from the network, until the superblock has been verified, would be to perform a full image-based backup, save the image locally, and then when the client is reconnected save the image to the server using SICS processing without using a local hash table.

Personal SICS with Intermittent Connection

One approach provides a "personal SICS" containing data from a single laptop by using a SHI SICS, while other approaches use UH SICS or UHI SICS. With regard to SHI SICS embodiments, one may first observe that laptop hard drives 102 are often significantly larger than most business users need for work related data. This extra space can be used for storing backups. If a SHI SICS is created in system storage in such a way that it is excluded from backups, then it can be used for holding backups of the remaining data on the system. One way to accomplish this is to place the SICS in a disk partition separate from the system's data (i.e., the OS, application and user data). The backup partition may occupy about two-thirds of the laptop's hard drive, in at least some embodiments; those of skill will readily be able to try other backup partition sizes and ratios and test user reaction to them.

On whatever schedule is determined to be appropriate, backups of the system's data are stored directly into this SICS on the laptop 1204. A copy of the SICS is stored on one or more servers 1208. In some embodiments, if multiple laptops are storing their SICS to the same server, then each SICS on the server would be unique, not consolidated, as the backup data in the SICS would correspond only to the owning system 1204. That is, the same block might well appear in several copies on the server, with each copy corresponding to a different laptop.

In some embodiments, a daemon 1214 running on the laptop system monitors the network 1206 connection. Whenever the daemon finds that it has a connection to the target server, with unused bandwidth and appropriate security, it transfers over any new blocks in the local SICS. In some embodiments the daemon can determine 1202 which blocks 104 need to be transferred because all new data is added to the end of the SICS. The daemon also transfers any associated linkage data 702 for each new image, taken since the last SICS sync between laptop 1204 and server 1208. As noted elsewhere, "laptop" is exemplary terminology defined herein, and refers to any intermittently connected device, not merely to a portable laptop computer.

In some embodiments using a UHI SICS solution, the SICS is created on the server and not stored locally on the laptop 1204. This SICS is only to be utilized by this single laptop; other laptops may have their own SICS elsewhere on the server. However, unlike other UH/UHI SICS approaches, the hash table 1210 for this SICS resides on the laptop; although it could be duplicated to the server, updates are initially made on the laptop. Whenever the laptop is connected to the network it can take backups directly into this SICS on the server.

If a scheduled or requested backup occurs when the laptop 1204 is not connected to the network, the SICS hash table residing on the laptop is sufficient to determine which clusters (or other blocks) are not already present in the SICS on the server, and thus which blocks need to be sent to the server and added to the SICS in server storage. These clusters are collected into a small data file and stored somewhere on the system 1204 in space for holding backed-up clusters, and where they can be excluded from future backups. The linkage data for the new image can be stored in the same area.

In some embodiments, a daemon running on the laptop system monitors the network connection. Whenever it finds that it has a connection to the target server 1208 (with unused bandwidth and appropriate security), it transfers over any new clusters from the backup storage into the SICS. Once these new blocks are added to the SICS, they can be deleted from the backup storage on the laptop. The implementation may be less complex if this is accomplished before the laptop takes another backup directly to the SICS, but this is not required in every embodiment. The daemon also transfers any associated linkage files for each new image, taken since the last SICS sync.

Reducing Network Traffic Using a Shared UH/UHI SICS Solution

Extending one of the ideas of the UH/UHI SICS solutions above, if multiple client machines 1204 are all saving their data to a common UH/UHI SICS server 1208, it is possible to further reduce already low bandwidth requirements, by having each client maintain their own copy of the hash table. With some UH/UHI SICS approaches, each client computes the hash values for each data block and sends them across the network to server, which determines if it has already seen them, which most of the time it has. By maintaining the hash table on each of the clients, the clients can eliminate sending any hash values to the server that are already in its hash table.

With a UHI implementation, when one client finds a data block not in its hash table, it sends that data block to the server. The server inserts this hash block into its repository and then broadcasts to each client the new hash value and the associated index. The server takes care to avoid multiple insertions if multiple clients submit the identical data block before the server has shared the new hash value with them.

A UH implementation can take the same approach as above (excluding transmittal of the indexes), but may be more efficient if the server does not automatically transmit new hashes to each client. Instead, when a client finds a new data block whose hash is not in its hash table, it sends just this hash value to the server to see if the server knows about it. If the server already knows about it, the client simply adds the hash value to its hash table. Otherwise it sends the new data block to the server. With this approach, hash values that a client cares about are transmitted exactly once to the server, and never from the server. Plus the server never needs to send any hash values that are not pertinent to a particular client.

With this approach, if a patch, new application or data set is installed to some or all of the client computers, this new data will only be transferred to the SICS by the first client computer to perform a backup after the new data is installed. All other client computers will find the matching hash values and not transfer this new data as part of their backup.

Shared SICS with Intermittent Connection

The ideas for reducing network bandwidth described above can also be applied to intermittently connected systems to allow them to perform backups even when they are offline, synchronizing the backup when they again connect with the server. Some implementations may take advantage of the reduced network bandwidth ideas described above, while other implementations may use superblocks for data verification.

FIGS. 15 to 18 further illustrate some intermittent systems, and some methods for backing up blocks (or more generally for otherwise processing blocks) in systems having intermittent network connections. The methods can be performed by software, which guides computer hardware, and which is in turn controlled (e.g., guided and/or started) by human users. The methods can be used by a client 1204 for processing blocks 104. The client has hashes 1210 that include a local set of processed block hash values 1602 and a local set of indeterminate status block hash values 1604.

During a determining step 1502 the software 1202 determines that network communication with a server is unavailable. This may be done by methods familiar in the art for monitoring server status and/or network connectivity. In some embodiments, both are monitored because the connectivity problem may be caused by the server, by a break in the connection to the server, or both.

During a determining step 1504 the software 1202 determines that a hash value is not in the local set of processed block hash values. The hash value corresponds to a block that may need to be backed up to the server or otherwise processed. The software also adds 1506 the hash value to the local set of indeterminate status block hash values, since the status of the block (has it been processed, or not?) is unknown. Hash tables, lists, and other suitable data structures may be used.

During a collecting step 1508 the software 1202 collects locally the block corresponding to the added hash value. This may be done by copying the block into local storage on the laptop to preserve the current data in the block. Storage in a dedicated storage partition may be used, or storage outside the defined partitions may be used, albeit with greater risk of loss if partitions are resized.

In some embodiments, the laptop storage has three areas: a working area in normal use by the operating system and user, a collection area holding copies of working area blocks pending determination of whether those blocks have already been transferred to the server SICS, and a local laptop SICS 1606, which contains a subset of the laptop's server SICS blocks. In such embodiments, the block may be processed locally 1510 by being placed in the local laptop SICS. In other embodiments, there is no local laptop SICS.

During a determining step 1512 the software 1202 determines that network communication with a server is available. This may be done by methods familiar in the art.

After communication with the server is available, a sending step 1514 sends indeterminate status block hash values to the server. These hash values may be sent individually, in several groups, or in a single group, over the network 1206 to the server, depending on the implementation.

The server receives 1802 the hash values, compares 1804 them with the hash values 1212 of processed blocks, and then tells the client which of the hash values, if any, have already been seen, that is, which ones correspond to blocks already processed by the server. This may be done in various ways, depending on the implementation. For instance, in one implementation the server sends 1516 back a list of seen hash values; in one, it sends a list of hash values not yet seen (i.e., not among the processed hash values). Instead of sending lists of hash values, the server could send a list of bits, with the Nth bit value stating the status of the Nth hash value sent by the client in the most recent outstanding batch, e.g., 0010011 could mean that the first, second, and fifth hash values in the list just sent appear in the server's list of processed block hash values, while the third, fourth, sixth and seventh hashes do not.

In some embodiments, the server sends 1806 seen hash values to all clients, not merely the client who inquired about them, so that all clients can add the seen hashes to their local sets 1602 of hashes that correspond to block processed by the server. In other embodiments, the server communicates hash status back only to the client that sent the hash to the server; the server does not 1808 broadcast the hash to other clients. As noted, the hash need not be sent 1810 back to the client that made the inquiry—a simple bitflag indicating the hash's status can be sent instead.

After being told 1516 by the server whether each sent hash value has already been seen by the server, the client proceeds based on that information. For instance, the client may discard 1518 collected blocks whose hash values have been seen by the server while maintaining those hash values in the local set of processed block hash values even after their blocks are processed. Thus, if the client again sees a block that has already been processed by the server, the client will determine 1504 that by checking it's local hash set without needing to ask the server again about that hash.

In some cases, the server will tell 1516 the client that one or more hash values had not been seen, that is, that they were not among the server's set of hash values of processed blocks. In such cases, the client may submit 1520 to the server 1208 for processing those blocks whose hash values had not yet been seen by the server.

In some embodiments, the client collects 1522 locally an additional set of indeterminate status blocks and corresponding hash values, to allow delayed processing when a previous collection has not yet been checked 1514, 1516 against the server 1208. In terms of FIG. 16, the system 1204 includes an additional local set of indeterminate status blocks and corresponding hash values. In such embodiments, it may occur that a first set of hash values 1604 of collected blocks is being or has been sent to the server but the reply from the server has not yet been received 1516, while a second set of hash values 1604 is being obtained, or has been obtained but not yet sent 1514 to the server. In due time, the client will receive 1524 a response to the second set, as it received 1516 status information for the first set. Hashes already seen by the server can then be added 1526 as appropriate, as such hashes were added 1506 for the first set. In some embodiments, sending 1514 indeterminate status block hash values to the server includes sending a superblock-hash-value, of the kind discussed elsewhere herein. Intermittent systems may use superblocks, but that is not necessarily required in every intermittent system.

In some embodiments, the client's set 1602 of processed block hash values begins as empty, and then grows as blocks are archived or otherwise processed by the server. In other embodiments, the client's set of processed block hash values is initialized and/or supplemented by hash values received from the server, for that purpose, without necessarily being sent to the client in response to collection 1508 of those corresponding blocks by the client. That is, the client receives from the server a list of processed block hash values, and places those hash values in the local set of processed block hash values, thereby initializing or updating that local set without necessarily collecting locally the corresponding blocks. This may be done by having the server initialize each client as the client comes online, and/or by having the server broadcast 1806 hash values as they are encountered in inquiries from other clients.

In one scenario, two clients 1204 are connected intermittently to a server 1208. After the first client collects blocks and submits hashes to the server, as shown for instance in steps 1502-1520 of FIG. 15 in the order shown, the second client sends 1528 to the server a hash value that was sent to the server by the first client. The second client then receives 1530 an indication (hash values, bitflags, etc.) that the server has already seen the hash value, and the second client then adds 1532 the hash value to a set of processed block hash values which is local at the second client. The second client does not 1534 submit the corresponding block to the server for processing, because the second client's status determiner 1202 has been told that the server has already processed the block in question.

In some embodiments, submitting a block for processing includes sending the block to the server to be placed in a backup repository, which is not local to the client. In some, it also includes processing locally 1510 a block which is submitted for processing, such as by placing the block in a local backup repository.

In some embodiments, a given client does not submit a given block to any other machine for processing if the hash value has already been seen by the server. That is, processing of a block found on the client occurs on the server and possibly on the client, but not on other clients. This is a hub-and-spoke server-client processing topology. In other embodiments, processing of a block found on one client may occur on the server, on the client in question, and also on one or more other clients. This is a mesh server-client processing topology; it differs from a full peer-to-peer topology in that the client-server pairs are not symmetric (servers keep full archives, for instance) whereas peers in a pair are symmetric. Some embodiments use a full peer-to-peer topology.

Some intermittent system embodiments include a computing system 1204 having a processor 1610 and a memory 1612 which are configured by software instructions and data 1214 for processing blocks 104. The intermittently connected client system includes a local set of processed block hash values 1602 identifying blocks known to have been processed by the server 1208. As shown, it also includes a local set of indeterminate status block hash values 1604 identifying blocks whose processing status has not yet been determined, e.g., the corresponding hash has not yet been 1514 sent to server, and/or that hash's status has not yet been received 1516 back from the server. The illustrated client 1204 in FIG. 16 also includes a local collection 1608 of blocks which have been collected 1508. The client 1204 may have a local block repository 1606 and process blocks locally by placing them in that repository, e.g., in a local SICS.

The software 1214 operates to add a hash value to the local set of indeterminate status block hash values when network communication with another device is unavailable and the hash value is not in the local set of processed block hash values; to discard collected blocks whose hash values have been seen by the other device after network communication with it is again available, yet maintain those hash values in the local set of processed block hash values even after their blocks are processed; and to submit for processing blocks whose hash values had not yet been seen by the other device. In some embodiments, the software also operates to compute superblock-hash-values and to use them in determining whether to discard collected blocks. In some embodiments, the software also operates to receive from another device (e.g., server, another client) a list of processed block hash values, and to place those hash values in the local set of processed block hash values, thereby initializing or updating that local set.

Figure 17:
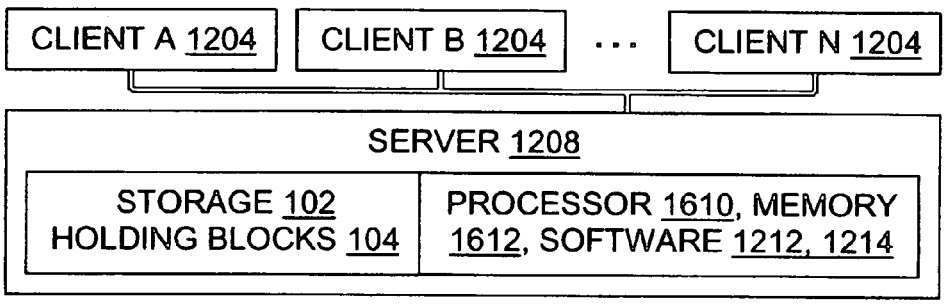
FIG. 17 is a diagram further illustrating client-server configurations.
Figure 18:
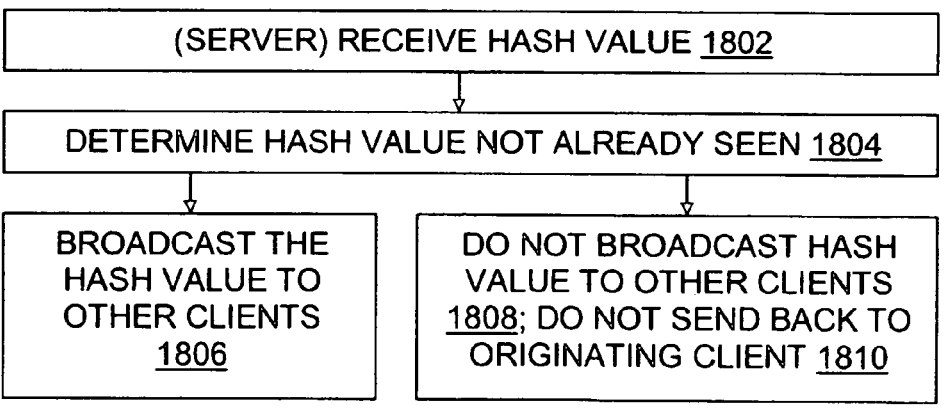
FIG. 18 is a flowchart further illustrating approaches for a server to use to facilitate efficient transfer of blocks from clients for processing.

As suggested by FIG. 17 in context, some embodiments of the invention include multiple machines. For instance, one embodiment includes at least two clients and a server, which are each at least connectable to a computing network. Each client is configured with a local repository 1606 and storage 102 as a means for storing blocks locally when disconnected from the network. Each client is also configured with a block status determining means such as processors 1610, memory 1612, hashes 1210, 1602, 1604, and software described above in discussing items 1214, 1202, 1404, for determining whether a block has been stored at the server. Each client is also configured with a block archiving means, such as network communications software (and perhaps compression/encryption/tamper-detection software), for sending to the server blocks which are not yet stored at the server. The server is configured with a central storage means, such as components, software, and data running on the server as discussed herein, for communicating with the clients and coordinating storage at the server of blocks sent to the server by the clients.

In some embodiments, the local repository means on the client includes a unique-hash single instance cluster store. In some, it includes a unique-hash-with-index single instance cluster store. In some, the local repository means software performs a method of reducing data processing using a superblock-hash-value. In some embodiments that have at least three clients, the central storage means software transmits 1806 to a given client hash values of blocks received at the server from other clients.

Embodiments of the invention are not limited to methods and systems. For instance, some embodiments are in the form of one or more computer storage media which are configured by instructions and/or data recorded therein, such that they cause a client 1204 to perform a method of archiving blocks or another method for processing blocks. Such configured media are within the scope of the invention with respect to a given entity, by virtue of being made and/or by virtue of being sold, by the entity, even if they are not run or similarly used by the entity that made them or sold them. Performance of the method is not required for infringement; making or selling media with the configuration is sufficient if the configuration would cause performance of a suitable method. Various methods of the invention will be recognized as suitable for configuring media.

One such method includes calculating 202, 302, 802 a hash value based on the content of a block; determining 402, 602, 806 that the hash value may not yet have been seen by a server; asking 804, 1514 the server whether the hash value was previously seen by the server; receiving 1516 an answer from the server; sending 810, 1520 the corresponding block to the server if the server answers that the hash value was not previously seen; and adding 604, 814, 1506 the hash value to a list of hash values seen by the server. In some such embodiments, operability of the client-server system containing the configured medium does not require that the server send the client any hash values for blocks that are not stored locally for the client. Hash values are sent from client to server, but need not 1810 be sent in the other direction.

Some embodiments of the invention include servers. Behavior and features of servers is implicit in the discussion above of clients, but some points may also be noted here. As illustrated in FIG. 17, one block repository server 1208 includes storage 102 holding stored blocks 104; software 1212, 1214, memory 1612, and a processor 1610 operable to store hash values 1212 corresponding to stored blocks, including some received 1802 from inquiring clients, to compare 806, 1804 hash values received from clients with said stored hash values, to indicate back 1516, 1806 to clients which received hash values do not match any of said stored hash values, to receive from clients blocks sent 1520 corresponding to said non-matching hash values, and to store said received blocks in said storage. In some, the server stores blocks in a unique-hash-with-index repository, in others it uses a unique-hash repository.

In some such embodiments, after receiving a non-matching hash value from one client, the software broadcasts 1806 that non-matching hash value to each other client. In other embodiments it does not. Thus, after receiving a non-matching hash value from one client, the software of some servers does not broadcast that non-matching hash value to each other client. In some, hash values corresponding to blocks sent by a particular client are submitted to the server once by that client, and are not transmitted by the server back to that client.

Base and Incremental Images

Those of skill will appreciate that alternative approaches may be worth considering regardless of whether they are ever implemented. For example, instead of using a SICS as discussed above, base and incremental images could be saved to the backup area, yielding somewhat similar results to embodiments of the invention. A daemon could synchronize new images back to a server. This could make it easier to control the amount of storage consumed on the server by backups, as older backups could be deleted if more room is needed. It is more difficult to reduce the size of a SICS allocated disk space. Unlike the UH/UHI solution, it could provide access to recent backups on the laptop, even when it is disconnected from the network. It might also be implemented effectively using much less space on the laptop than SHI SICS.

However, it is believed that the UH/UHI SICS data that needs to be stored locally will never be larger than the corresponding incremental backup and will often be smaller. SHI SICS can store a much larger set of backups in the same space, providing the user with offline access to much larger set of historic data than incrementals. Occasional full backup images are required, which results in very large data transfers across the network. Even incremental images often contain redundant data, especially if a defragger is running on the system. So on average significantly more data would be transferred across the network to replicate the backups to the server.

Embodiments are not Limited to Cluster Stores

Although work on cluster stores provided precursors and thought-experiment environments for the present invention, and cluster stores can be implemented using the present invention, embodiments of the present invention are not limited to cluster stores. Other replication and remote-backup algorithms that use a hash to determine if a particular data block is already present at the remote location may also utilize inventive functionality. Moreover, tasks outside the imaging/backup arena may utilize inventive functionality. Some examples are given below. As with the other examples provided herein, these are meant to aid understanding of the invention, not to rule out additional uses, since it is not feasible (or required) to list herein each and every possible use of the invention.

As an example, consider a natural language translation system in which one process gathers textual documents in a first language and stores them in a RAID array, and another process retrieves documents from storage for translation (which could be computer-assisted or full machine translation). The same text may be encountered more than once, as the same story is repeated on different web sites or in different publications, for instance. In general, it may well be easier to gather documents than to translate them, so there will be a backlog of untranslated documents, and the translation service is thus a relatively scare resource that should be conserved. In particular, the process that is gathering documents would benefit from some ability to avoid storing multiple copies of the same text, so that scarce translation resources are not wasted by translating the same text more than once. Toward that end, the document-gathering-and-storing process could use hashes, in a manner described herein, to detect documents whose text has already been stored and to avoid storing a redundant copy of such text. Alternately, or in addition, it could use hashes to avoid translating the same text more than once, even if some redundant copies are stored.

Before turning to other specific examples, consider the impact that a system architecture may have in creating opportunities to use the present invention. In some architectures, such as some multi-stage signal processing architectures, the status of processing of a block of data is implicit in the block's present storage location. For instance, an architecture may be one in which a data block is not received at stage N+1 until it has been processed at stage N, so the invention is not needed to tell whether processing has occurred.

But in other architectures, data is stored, is then pulled later from storage to be processed, and the status of processing of a block of data is not implicit in the block's present storage location. Some examples include architectures in which a stream of data blocks flows into storage and the blocks are then retrieved from storage, in some other order than the order they were stored in, to be processed. Cluster store architectures like those consistent with FIG. 1 are an example, but there are many other possibilities as well. In such architectures, hashes and superblocks could be used as described herein to determine whether a block should be stored at all (if duplicates are not being stored) and/or used to determine whether a stored block contains the same data as some other block that was already processed (if duplicates are not being processed or if duplicates are processed in a different way).

As an example, consider an image processing system in which multiple raw visual images are the initial input, and the processing goal is to produce a single larger and clearer image from them. This could be useful, for instance, when a remote-controlled or robotic vehicle roaming an environment takes multiple small snapshots (in series and/or in parallel), and sends them back to a base over a low-bandwidth connection, to be used there in producing a larger and clearer image of the environment in question. The processing aligns the raw small images, and enhances them through signal processing, edge detection, and so on. In such a system, hashes of the constituent blocks which make up the raw small images could be taken and then used to detect overlapping areas of those small images. This could assist alignment of the smaller images when forming the larger montage or composite image. It could also conserve processing, if some processing is done on individual small images rather than the composite, by preventing processing of overlapping portions of the small images. The same image data would not be processed again when it is encountered in a second or subsequent small image.

Other forms of processing, such as numerical processing, statistical processing, compression/decompression, data transmission, data storage, encryption/decryption, and so on, can also use hashes and superblocks as described herein to efficiently detect blocks of data that have already been processed. This can be done without routinely comparing actual data, and also without simply assuming that the data is identical merely because the hashes are identical.

As yet another example, assume that a search engine has access to several databases, that some records appear in more than one database, and that the databases are not being changed but instead are merely being searched. This would be the case, for instance, in searches of past snapshots of the databases, such as searches of cached or archived web pages. Assume also that the user wishes to see exactly one entry for any given matching record in the results of a specified search. The search is to be made in more than one of the databases, so duplicate entries in the search results are theoretically possible. In this situation, the search engine could tag each record it encounters with a hash. Over time, more and more records (sectors, clusters, web pages, or other blocks) will be tagged, so the I/O and computation needed to do the tagging tends to decrease. By using the hash tags as described herein, the search engine could reliably and efficiently place each matching record in the search results exactly once.

Although many of the examples provided herein speak in terms of detecting processed (e.g., stored, transferred) blocks of data, and thereby distinguish between zero and one instances of processing, the invention may also be used in systems or methods that distinguish other processing counts. For example, it may be used to help distinguish between zero and N instances of processing, where N is a cardinal number, or between 1 and N instances, or between M and N instances (M,N being different cardinal numbers).

An example is provided by a multicasting peer-to-peer system. Assume N nodes are connected to each other, directly or indirectly, and that each can transmit to at least some of the others. Assume also that one or more of them, but not all of them, contain pieces (blocks or sets of blocks) of a dataset which is to be fully assembled on each of them. The dataset pieces are all there, but they are scattered among the nodes, and some of the dataset pieces are initially present on more than one of the nodes.

Perhaps the most obvious way to get a copy of every piece to every node is for each node to send every other node a full copy of all the pieces that node has. But this approach would send extra copies. Indeed, as a node receives pieces it lacked and begins sending them to all other nodes except the one they came to it from, the load on the network connections could be severe.

To reduce the network load, various approaches can be taken. For instance, the nodes could "elect" a single node to receive all the pieces from all the other nodes, which do not initially receive but only transmit, and which transmit only to the elected node. The elected node would ignore the duplicate pieces, and then transmit the full dataset to the other nodes. Alternately, the nodes could be placed in some order, and then take turns transmitting. Node 1 would send all its pieces to each of the other nodes, then node 2 would send all its pieces to each of the other nodes, and so on. There may certainly be other approaches as well. The point is that in many of these approaches, the invention could be used to reduce unnecessary transmission of the pieces. Hash values representing pieces could be transmitted instead of pieces, in many cases, with the pieces themselves being transmitted only when the nodes determine that is necessary, by using hashes and superblocks as described herein.

Methods Generally

FIGS. 8 through 11 illustrate methods of the present invention. The invention may be embodied in methods, in storage media configured to perform methods and/or configured by data structures that assist certain methods, and in systems, for example. Although we focus discussion on methods at this point, it will be understood that much of what is said in the text and shown in the drawings about method embodiments also helps explain configured medium and system embodiments, and vice versa. For instance, in some embodiments the status determiners 1202, 1404, and/or the processing modules 1214 include software that performs one or more of the methods illustrated in FIGS. 8-11. Likewise, some embodiments of systems (such as server 1208 systems and/or client 1204 systems) that include a means for determining the processing status of a block of data do so by including software and/or hardware which performs one or more of the methods illustrated in FIGS. 8-11.

Although steps are shown in a particular order in the figures, that is done in part for ease of illustration. Those of skill will appreciate that steps may also be performed in reversed or otherwise altered order, or concurrently, when the outcome of a given step is not needed before the commencement of another step. Steps may also be named differently, grouped differently, repeated, separated by intervening actions, and/or omitted, except as specifically required by the claims and/or by operability of the invention.

During an obtaining step (not shown), an embodiment obtains a data-block containing data contents. Data-blocks, which are also referred to as blocks above, may be obtained by receiving them from another computer, by generating them on the computer in question, by retrieving them from a storage device, or by other means. Hash values may likewise be obtained by calculating them, retrieving them, or receiving them. Note also that even though many examples in this document speak in terms of computers, other devices may also operate according to the invention, particularly if they include processing and memory elements for handling digital data. Thus, the invention may be used on stand-alone computers, networked computers, personal digital assistants, cell phones, other wireless communication devices, and other devices.

During a computing step 802, the embodiment calculates a data-block-hash-value based at least in part on the data contents of the block. This may include computing 202 a CRC, computing 302 a cryptographically strong hash, or otherwise computing a hash value. This step 802 may be accomplished using software and/or hardware, by using any of a variety of familiar or previously unknown hash functions. The characteristics of hash functions have been widely studied, and it will be understood that some experimentation may be helpful in selecting, writing, or fine-tuning a hash function. Step 802 may also be accomplished by looking up or otherwise retrieving a previously calculated hash value.

During an optional communicating step 804, the computing device in question transmits or receives the data-block-hash-value computed by step 802. All steps are optional, in the sense that they may be omitted from a given embodiment even though they are shown in the figures, unless that omission is contrary to the claim in question or operability of the invention. But the optional nature of step 804 also stems from the fact that some embodiments communicate hash values between computers, while other embodiments do not.

In some embodiments, the blocks are obtained at a given machine, their processing status is determined (using hash values, superblocks, etc.) at that same machine, and if not yet sufficiently processed they are then submitted for processing at that same machine. No communication of hash values to another machine is required. In a cluster store stand-alone embodiment, for example, the blocks could be retrieved from a laptop's working disk storage that holds user data and applications, their hash values could be computed on the laptop, and if they are not yet in a cluster store kept in disk space on the laptop that is dedicated for archival, then they could be added to that cluster store.

In other embodiments, hash values are communicated. Communication may be by network transmission or other data transfer between two or more computers, or between other computing devices configured according to the invention. Whether the hash values are transmitted, received, or both, depends on which embodiment and which machine defines one's perspective.

For example, in one embodiment each client 1204 computes the hashes 1210 for blocks in its working storage, and then it transmits 804 those hashes to the SICS server 1208. The server checks 806 the hashes it receives 804 from the clients against its own list of hashes 1212 of blocks it has stored in the SICS, and then it replies 804 to each respective client with a list of hashes received from the client and not found by the server in the processed blocks' hash set. Those hashes represent 808 blocks not yet stored in the server SICS. The other hashes sent do match, so the blocks for those hashes are added 816 to a superblock, which is then used 820-826 (as discussed more fully elsewhere herein) to determine which client blocks, if any, have the same hash but different data content than a corresponding server block and thus need to be added 1102 to the server SICS.

In another embodiment, the server 1208 transmits 804 to each client 1204 a copy of the hashes currently in the processed blocks' hash set 1212, and the clients then compare 806 those hashes with their own blocks' hashes 1210. In this embodiment the comparison 806 is done on the clients 1204 (in status determiner 1202 and/or processing modules 1214, for instance), whereas in the embodiment discussed in the immediately preceding paragraph, the comparison 806 is done on the server 1208. After the comparison, blocks whose hashes do not match 808 are sent 810 across the network 1206 to the server to be stored 812 in the server SICS. These blocks' hashes are also sent 804 to the server, which adds 814 them to the processed blocks' hash set 1212 in conjunction with adding 812 the corresponding blocks 104 to the SICS 102.

Thus, in some embodiments, the step 804 of receiving/transmitting the server's processed-superblock-hash-value over a computer network connection 1206 occurs before the step of comparing 824 it to the superblock-hash-value is done at the client. In other embodiments, the client's superblock-hash-value is received/transmitted over the network before the comparison is done at the server.

More generally, the invention provides methods which include determining 806 whether the data-block-hash-value appears in a set of processed-block-hash-values of data-blocks. The set of processed-block-hash-values may be implemented using a list, array, tree, or other data structure; the term "set" is meant to allow a wide variety of data structures in different embodiments. In particular, it will be appreciated that ordering the set 1212 of processed-block-hash-values can make the comparison 806 more efficient, but is not necessarily required.

Figure 8:
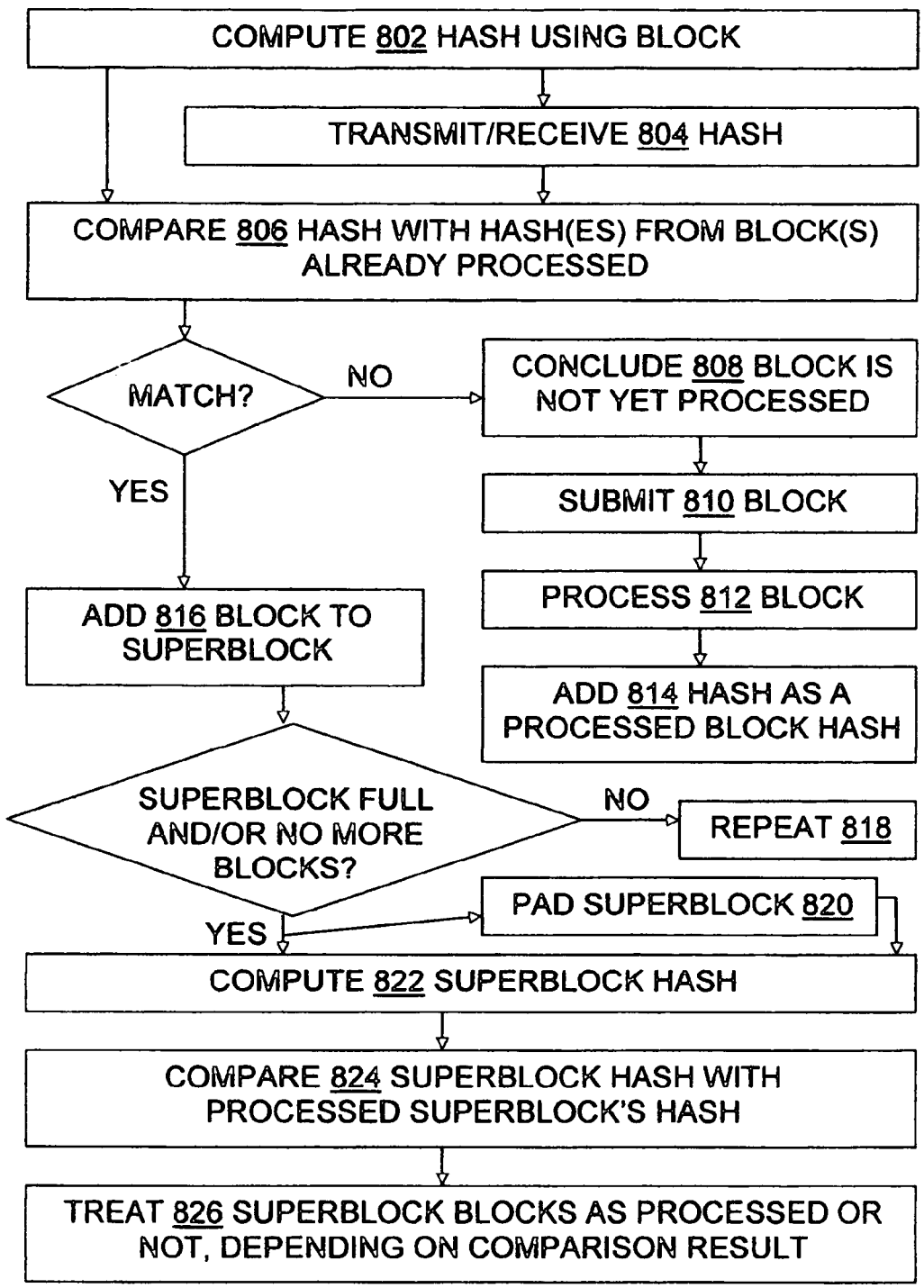
FIG. 8 is a flowchart illustrating a superblock-based approach to determining whether blocks have been processed.

If the data-block-hash-value was not in the set of processed-block-hash-values (indicated by the "no" branch of the "match?" decision diamond in FIG. 8), then the method includes concluding 808 that the block is not yet processed. This conclusion may be explicit, as evidenced by a message to a user, or it may be implicit, as in a step 810 of submitting the data-block for processing.

Subsequent processing 812 of the block may include transferring the data-block contents across a network link to a remote server computer as part of a data backup procedure, for example. But processing is not necessarily limited to the backup arena. Other processing 812 of blocks is also possible, including image processing, signal processing, encryption-related processing such as encryption and/or decryption, compression-related processing such as compression and/or decompression, translation, and so on.

The step 814 adds the data-block-hash-value 1210 to the set of processed-block-hash-values 1212 if the data-block-hash-value was not already in the set. Step 814 may be done on a client, a server, both, or a stand-alone machine, depending on the embodiment.

If the data-block-hash-value was in the set of processed-block-hash-values (indicated by the "yes" branch of the "match?" decision diamond in FIG. 8), then the method includes adding 816 the data-block 104 to a superblock 1402 of data-blocks. This may be done by retrieving the content of the block and copying it into a dedicated superblock region of memory, for instance, at an offset in that region determined by the number of blocks already added 816 and the size of each of those blocks (if uniform-sized blocks are being used). In some embodiments, the step of calculating 822 a superblock-hash-value occurs only after a predetermined number of data-blocks are added 816 to the superblock. In others, the client, the server, or either, may request calculation 822 and comparison 824 of the superblock hashes at other times, e.g., when the load on the CPU falls below a certain level.

The steps of comparing 806 hashes and adding 816 more blocks to the superblock may be repeated 818 until the superblock is full and/or there are no more blocks 104 for which processing status is to be determined. Alternately, hash-computing 802 and communicating 804 steps may also be part of the repetition 818. It is also understood that some hashes might not match, so steps 808-814 may be part of the repetition 818.

The step 822 of calculating a superblock-hash-value using the contents of data-blocks in the superblock may use the same hash function as step 802 of computing individual block hash values. Alternately, it may use a different hash function. In some embodiments, different individual block hashes are calculated 802 using different hash functions; the choice of hash function is coordinated between client and server.

In some embodiments, the superblock-hash-value has more bits than the data-block-hash-value, while in others it has the same number of bits, and in yet others it has fewer bits. One embodiment uses, for each obtained data-block in the superblock, a data-block-larger-hash-value that has more bits than the number of bits in the data-block's initially compared 806 data-block-hash-value. Treating 826 at least one data-block in the superblock as not yet processed if the superblock-hash-value does not match the processed-superblock-hash-value may then include determining whether the data-block-larger-hash-value appears in a set 1212 of processed-block-larger-hash-values of data-blocks. If the data-block-larger-hash-value was not in the set of processed-block-larger-hash-values, then the embodiment submits 810 the data-block for processing, but if the data-block-larger-hash-value was in the set of processed-block-hash-values, then it treats the data-block as processed.

The step 824 of comparing the superblock-hash-value to a processed-superblock-hash-value may be done at the server or at the client. In stand-alone configurations, it would be performed at the solitary computer in question.

Figure 11:
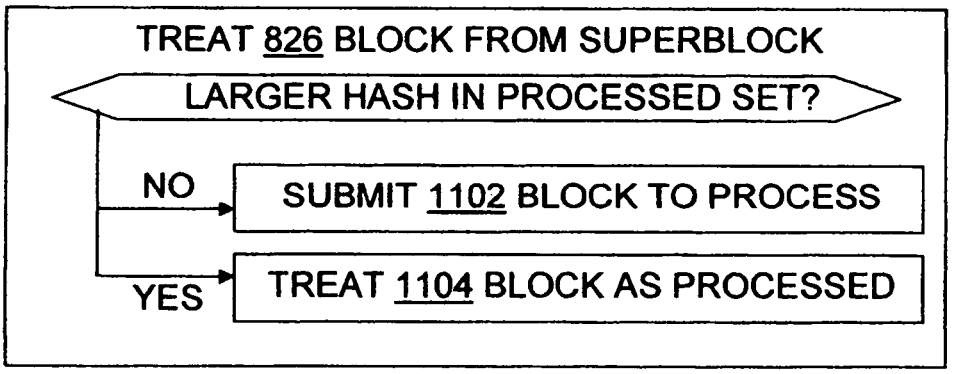
FIG. 11 is a flowchart further illustrating treatment of a block which has been designated part of a superblock.

For convenient illustration, and consistent with the fact that steps may be grouped, FIG. 8 shows a single box for a step 826. Step 826 includes treating 1104 data-blocks in the superblock as processed if the superblock-hash-value matches the processed-superblock-hash-value, and treating 1102 at least one data-block in the superblock as not yet processed if the superblock-hash-value does not match the processed-superblock-hash-value. Step 826 could thus also be viewed as multiple steps, as shown in FIG. 11, for example.

It will be understood that if the superblock hashes match, the probability of any block in the two superblocks having different content is so exceedingly small that it can be ignored in practice. The level of certainty provided by matching superblock hashes is believed to be an improvement over that provided by mere individual block hashes as in rsync, Venti, and so on.

On the other hand, if the superblock hashes differ, then the content of at least one block differs between the two superblocks. The difference is most likely due to data content differences in a single block, but it could be due to content differences in multiple blocks of the superblock. Thus, some embodiments stop checking after finding one differing block of the superblocks, while other embodiments check the content of every superblock block against the corresponding block of the other superblock. It will be understood that in embodiments attempting to use coordinated random blocks 1408, a difference in superblock hashes could also be due to a failure to coordinate the random content 1408 of the two superblocks whose hashes differ.

Figure 9:
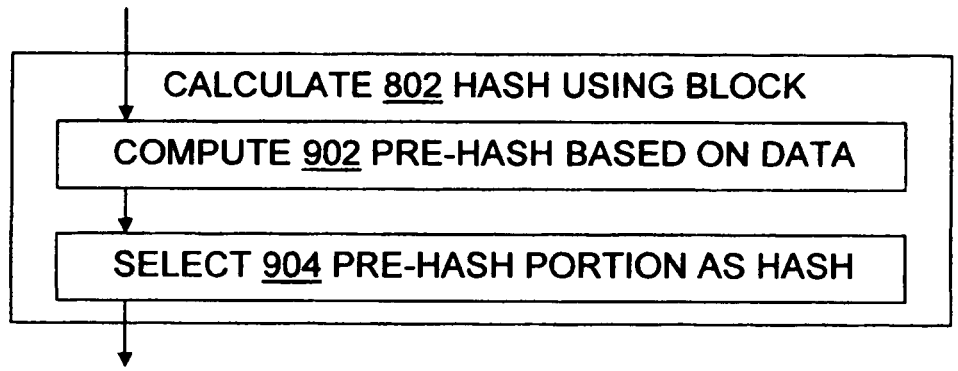
FIG. 9 is a flowchart further illustrating calculation of a hash value using selection of a portion of a larger value.

FIG. 9 illustrates a variation, in which the step 802 of calculating a data-block-hash-value includes calculating a hash value based on the data contents and then selecting only a portion of that hash value to be the data-block-hash-value. In this embodiment, calculation 802 of an individual block's hash value includes two steps. First, a pre-hash is computed 902 based on the block's data. This pre-hash can be considered a regular hash value in other contexts, and can be computed accordingly using a hash function. But in this context, a portion of the pre-hash is selected 904 and used as the block's hash value in subsequent steps, e.g., steps 804, 806, and 814. For instance, one might use only 120 bits of a 160-bit SHA-1 hash value, in order to reduce the network bandwidth used when communicating hash values.

Figure 10:
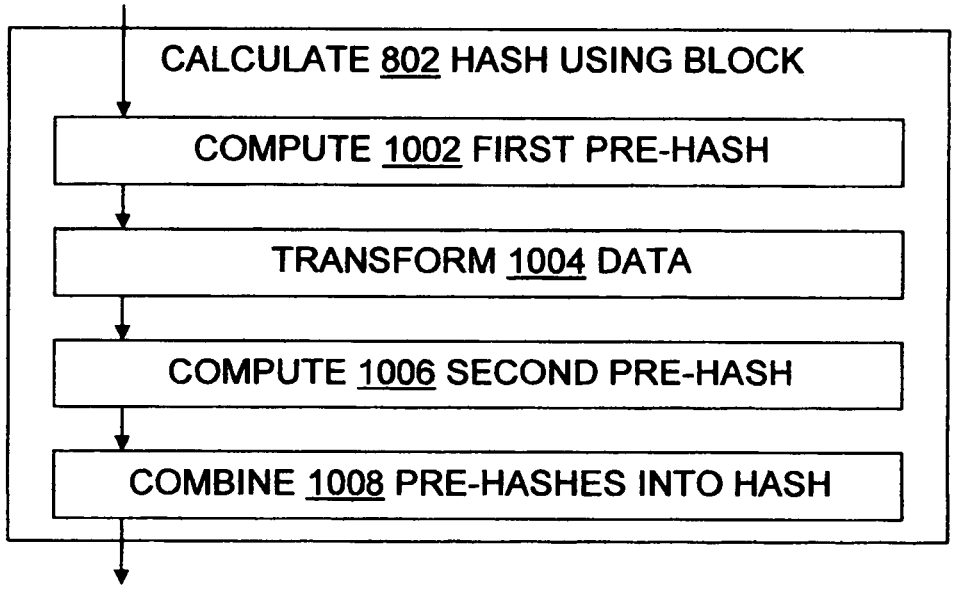
FIG. 10 is a flowchart further illustrating calculation of a hash value using data transformation and combination of hash values.

FIG. 10 illustrates another variation, in which calculation 802 of an individual block's hash value includes four steps. A first pre-hash is computed 1002, based on the block's data. The block's data is then transformed 1004 in some way. The transformation 1004 may be explicit, as when a copy of the block's data is bitwise XORed or ANDed with a mask, for instance. The transformation 1004 may also be implicit, as when a second pre-hash is computed 1006 by traversing a different part of the data and/or by traversing the block's data in a different order. For instance, the second pre-hash may be calculated using the same hash function as the first pre-hash but ignoring the first N bytes of the block's data, or treating the first N bytes as zeroed. As another example, the second pre-hash may be calculated by reading the block's data in reverse order from the calculation 1002 of the first pre-hash. Different hash functions may also be used for the two calculations 1002, 1006. The pre-hashes may each be considered a regular hash value in other contexts, and can be computed 1002, 1006 accordingly using a hash function.

Finally, the two pre-hashes are combined 1008 into a single value which then serves 804, 806, 814 as the block's hash value. Combination 1008 may be accomplished by abutting the two pre-hashes, or by interleaving their bits in some finer-grained manner (N bits from first pre-hash, M bits from second pre-hash, next N bits from first pre-hash, next M bits from second, etc.) Combination 1000 may also be accomplished by other means, such as by multiplying the two hash values.

More About Systems and Configured Media

Figure 12:
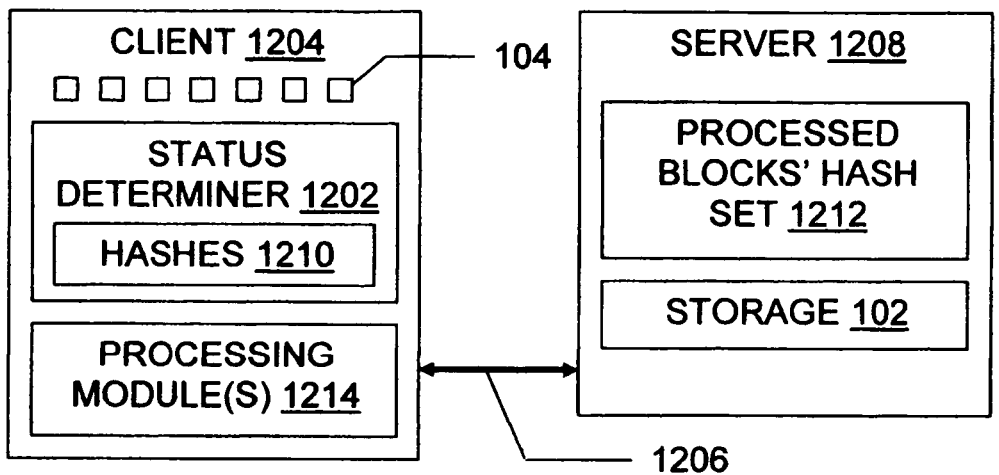
FIG. 12 is a diagram illustrating client-server configurations which may be used in some systems and methods that determine whether blocks have been processed.
Figure 14:
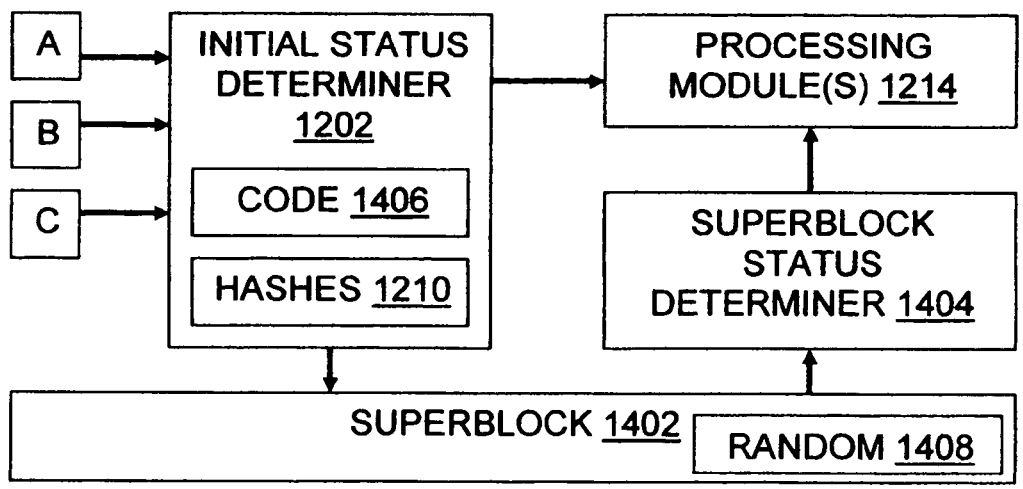
FIG. 14 is a diagram further illustrating some systems and methods that use at least one superblock in determining whether blocks have been processed.
Figure 15:
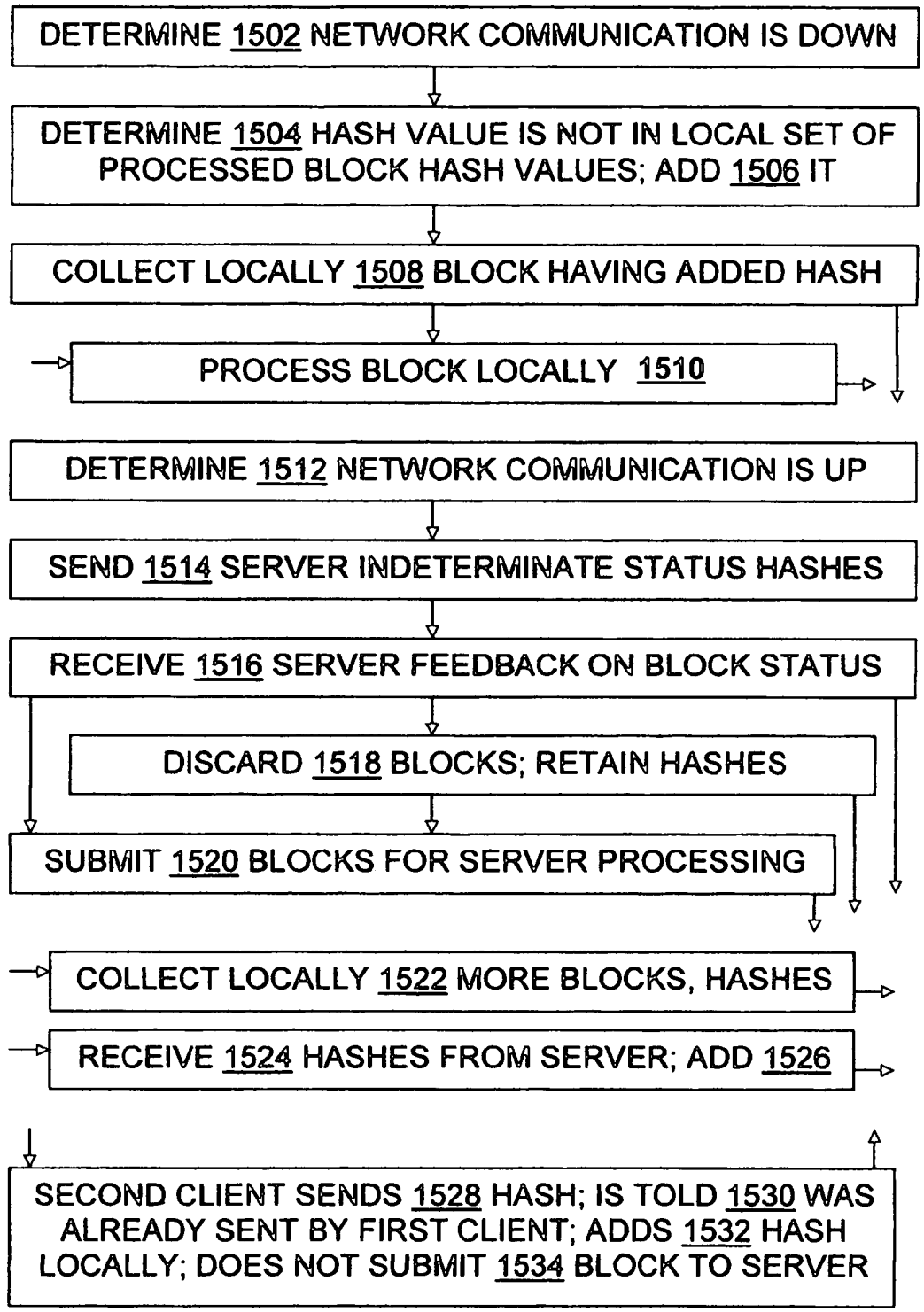
FIG. 15 is a flowchart illustrating approaches for determining whether blocks have been processed, despite interruptions in network communications, by using hash values locally.
Figure 16:
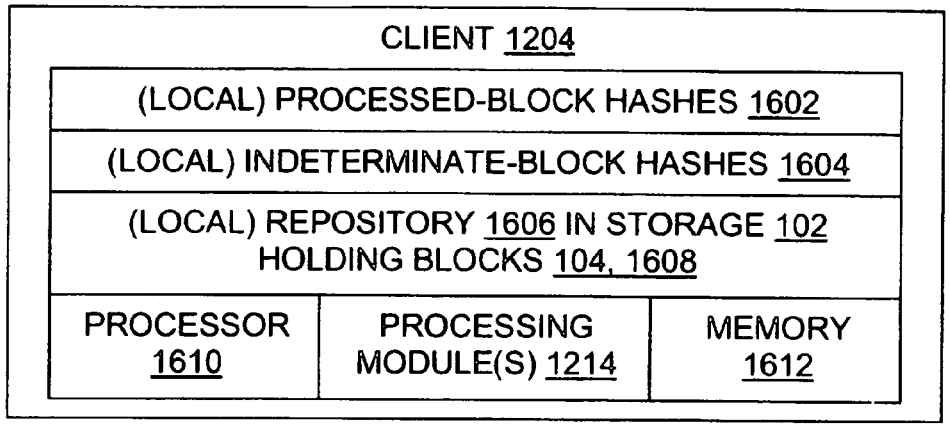
FIG. 16 is a diagram further illustrating client configurations.

As illustrated in FIGS. 12-14, for example, the present invention also provides systems. The systems of the invention are not limited to those shown in these particular figures. Different embodiments may omit, repeat, regroup, supplement, or rearrange the components illustrated, provided the system overall is operable and conforms to at least one claim. Any computer or set of computers configured with software and/or special-purpose hardware to operate according to a method of the invention, including without limitation methods discussed in connection with any of present FIGS. 8-11, is also a system according to the invention, if only because through such a system one uses a claimed method. In claims directed to systems having a means for determining the processing status of a block, for instance, suitable means include without limitation software which operates according to any of the methods shown in FIGS. 8-11.

It will be understood that a computer system such as client 1204 or server 1208 has at least one processor (a.k.a. CPU) and some associated memory, as a means for running software in the computer. A disk drive, flash memory, tape, and/or other storage 102 serves as a storage means for storing software and other data in a location accessible by the software-running means.

In particular and without eliminating other possibilities, the software (and its component code 12406, hashes 1210, 1212, modules 1214, and status determiners 1202, 1404) may reside on and configure a removable storage medium. Suitable media include one or more removable storage media such as memory keys, flash memory, CDs, DVDs, floppy disks, or other media removable from a computer and capable of carrying computer-readable data which persists even when power to the computer is turned off. Such media in their unformatted states and their generically formatted states are previously known. However, the invention permits the media to be specifically tailored to perform methods such as those illustrated by present FIGS. 8-11, by magnetic, optical, or other bit-storing configurations of data and instructions for performing such methods.

The components shown in the Figures may be combined in various ways, as recited in the claims. No particular file system format or programming language is required by the present invention, and a variety of operating systems and network protocols can likewise be used. Not every illustrated component need be present in every claimed embodiment. It will be appreciated that different embodiments may locate some or all of these components differently than a specific example given here.

It is understood that a single entity may sell, offer to sell, or use a system whose individual parts were made by more than one entity. That is, the mere fact that parts of a system were supplied by different vendors does not prevent use of that system (and hence direct infringement) by an individual entity.

It will be understood that the relative locations of components (e.g., hash tables, superblocks, code, storage) can make the system in question easier to use, faster, less space-consuming, more secure, or otherwise improve it. More generally, variations on the specific examples given herein will be apparent to those of skill in the art, bearing in mind considerations of operability, efficiency, security, ease, speed, maintainability, and other familiar criteria, in view of the descriptions provided in this document In general, the labels attached to items are not more important than the functionality involved. For instance, in some embodiments it may be more convenient to consider the superblock status determiner 1404 and the individual block initial status determiner 1202 as part of the same item, even though FIG. 14 shows them as distinct. Infringement is not avoided by pointing to some inconsistency between an accused embodiment and part of the invention description, when the claimed invention is clear to one of skill and otherwise covers the accused embodiment. It is not necessary for every means or aspect identified in a given definition or example to be present or to be utilized in every embodiment of the invention.

CONCLUSION

Methods are provided for safely reducing data processing, by detecting data already processed, by comparing data superblock hashes when individual data block hashes match. Systems and configured storage media for safely reducing data processing are also provided. Particular embodiments of the invention may significantly reduce the probability that an undetected hash collision will result in data loss in a UH/UHI SICS, for instance, and may further reduce the amount of network bandwidth required to implement a UH/UHI SICS. Similar benefits may be gained by other replication and remote-backup tools that use a hash to determine if data is already present at the remote location, and by other forms of processing outside the backup arena.

Some embodiments of the invention allow local backups to occur on a laptop when it is disconnected from the network. Keeping on the laptop only blocks that were not yet seen by the server helps keep the backup space needed on the laptop much smaller than a normal or incremental backup. A user will not typically perform a restore from only this data on the laptop, however, because the restore would often need to pull from the server data blocks that were previously seen there.

Some inventive methods are performed directly by computer hardware and software, and are used by people. They are performed on behalf of and in response to some person's controlling action. Regardless of whether one phrases the invention in terms of steps taken by a person to control a machine that performs a process, or in terms of using a corresponding process performed by a machine, those of skill will understand that it is the particular nature of the process itself that sets it apart as inventive.

Even though particular embodiments and uses of the present invention are expressly illustrated and described individually herein, it will be appreciated that discussion of one type of embodiment and its uses also generally extends to other embodiment types and their uses. For instance, the foregoing description of the invention's methods also helps describe the structures and operation of the invention's systems and configured storage media, and vice versa. It does not follow that limitations from one embodiment are necessarily read into another.

Headings are for convenience only; information on a given topic may sometimes be found outside the section whose heading indicates that topic. All claims as filed are part of the specification and thus help describe the invention, and repeated claim language may be inserted outside the claims as needed during prosecution.

Explanations given herein of the principles of the invention do not destroy the invention's usefulness if they are subsequently determined to be erroneous. Likewise, probability calculations and other discussions of specific aspects of the examples may be subject to correction without thereby undermining the invention's advantages and novelty.

It is to be understood that the above-referenced embodiments are merely illustrative of the application for the principles of the present invention. Numerous modifications and alternative embodiments can be devised without departing from the spirit and scope of the present invention. While the present invention has been shown in the drawings and described above in connection with the exemplary embodiments of the invention, it will be apparent to those of ordinary skill in the art that numerous modifications can be made without departing from the principles and concepts of the invention as set forth in the claims.

As used herein, terms such as "a" and "the" and designations such as "hash" and "calculating" are inclusive of one or more of the indicated thing or step. In particular, in the claims a reference to a thing generally means at least one such thing is present and a reference to a step means at least one instance of the step is performed. Some terms in the claims are hyphenated for convenience, but it will be understood that the terms may also be written without hyphens. For instance, the terms "hash value" and "hash-value" are interchangeable.

The scope of the invention is indicated by the appended claims rather than by the foregoing description. All changes which come within the meaning and range of equivalency of the claims are to be embraced within their scope to the full extent permitted by law.

What is claimed is:

1. A method for use by clients for processing blocks, the method comprising executing:
    determining, at a first client that comprises a processor, a local set of processed block hash values, and a local set of indeterminate status block hash values, that a hash value is not in the local set of processed block hash values;
    sending indeterminate status block hash values from the first client to the server;
    receiving an indication at the first client as to whether each sent hash value has already been seen by the server;
    discarding collected blocks at the first client whose hash values have been seen by the server but maintaining those hash values in the local set of processed block hash values even after their blocks are processed;
    submitting, from the first client to the server, for processing blocks whose hash values have not yet been seen by the server;
    sending, from a second client to the server, the hash value that was sent to the server by the first client;
    receiving, at the second client, an indication that the server has already seen the hash value;
    adding the hash value to a second set of processed block hash values at the second client;
    refraining, at the second client, from submitting to the server for processing the block that corresponds to the hash value that has already been seen by the server.

2. The method of claim 1, further comprising the steps of:
    determining that network communication with the server is unavailable;
    collecting, at the first client, the hash values and corresponding blocks locally when the hash value is not in the local set of processed block hash values;
    after communication with the server is available, sending the locally collected indeterminate status block hash values from the first client to the server and continuing with the steps of claim 1.

3. The method of claim 2, further comprising the step of collecting locally at the first client an additional set of indeterminate status blocks and corresponding hash values, thereby allowing delayed processing when a previous collection has not yet been checked against the server.

4. The method of claim 1, wherein the step of sending indeterminate status block hash values from the first client to the server comprises sending a superblock-hash value.

5. The method of claim 1, further comprising the steps of:
    receiving, at the first client, a list of processed block hash values from the server; and
    placing those hash values in the local set of processed block hash values at the first client, thereby initializing or updating that local set without necessarily collecting locally the corresponding blocks.

6. The method of claim 1, wherein the step of submitting, from the first client to the server, for processing comprises sending the block from the first client to the server to be placed in a backup repository which is not local to the first client.

7. The method of claim 1, further comprising processing locally at the first client a block which is submitted for processing, said processing comprising placing the block in a local backup repository at the first client.

8. The method of claim 1, wherein the first client does not submit the block to any other machine for processing if the hash value has already been seen by the server.

9. A computing system having a processor and a memory which are configured by software instructions and data for processing blocks, comprising a device having:
 a local set of processed block hash values;
 a local set of indeterminate status block hash values; and
 a local collection of blocks;
 wherein the software instructions operates to:
  add a hash value to the local set of indeterminate status block hash values when network communication with a server is unavailable and the hash value is not in the local set of processed block hash values;
  after network communication with the server is again available, send to the server indeterminate block hash values that were previously sent to the server by a second device;
  receive an indication that the server has already seen the hash values;
  discard collected blocks that correspond to the hash values that have already been seen by the server, yet add those hash values to the local set of processed block hash values;
  refrain from submitting for processing blocks whose hash values have already been seen by the server; and
  submit for processing blocks whose content or hash values have not yet been seen by the server.

10. The system of claim 9, wherein the software instructions also operate to compute superblock-hash values and to use them in determining whether to discard collected blocks.

11. The system of claim 9, further comprising an additional local set of indeterminate status blocks and corresponding hash values.

12. The system of claim 9, wherein the software instructions further operate to:
 receive from the server a list of processed block hash values; and
 place those hash values in the local set of processed block hash values, thereby initializing or updating that local set.

13. The system of claim 9, wherein the device has a local block repository and processes blocks locally by placing them in that repository.

14. The system of claim 9, wherein the device maintains hash values locally without sending them to the server.

15. The system of claim 9, wherein the device maintains hash values locally and also sends them to the server.

16. A computing system comprising:
 a first client, a second client, and a server, each of which comprises a processor and memory and each of which is at least connectable to a computing network;
 wherein the first client is configured with:
  a local repository means for storing blocks locally when disconnected from the network;
  a block status determining means for determining whether a block has been stored at the server by:
   sending to the server, after reconnecting to the network, a hash value for the block;
   receiving an indication that the server:
    previously received the block from the second client; and
    has stored the block at the server;
  a block archiving means for:
   refraining from submitting for processing the block that has already been stored at the server;
   discarding the block that has already been stored at the server; and
   locally storing the hash value of the block that has already been stored at the server; and
   sending to the server blocks which are not yet stored at the server; and
 wherein the server is configured with a central storage means for:
  communicating with the first and second clients; and
  coordinating storage at the server of blocks sent to the server by the first and second clients.

17. The system of claim 16, wherein the local repository means comprises a unique-hash single instance cluster store.

18. The system of claim 16, wherein the local repository means comprises a unique-hash-with-index single instance cluster store.

19. The system of claim 16, wherein the local repository means comprises software for performing a method of reducing data processing using a superblock-hash value.

20. The system of claim 16, further comprising at least three clients, wherein the central storage means comprises software for transmitting to a given client hash values of blocks received at the server from other clients.

21. The system of claim 16, wherein the block status determining means includes a local hash table of blocks have been at least partially processed, and wherein a corresponding server hash table in the central storage means is updated to include values found in the local hash table.

22. A configured computer storage medium for causing a processor of a client to perform execute a method of archiving blocks, the method comprising:
 Calculating, using said processor of the client a hash value based on the content of a block;
 determining that the hash value may not yet have been seen by a server;
 asking the server whether the hash value was previously seen by the server;
 receiving an answer from the server;
 sending the corresponding block to the server if the server answers that the hash value was not previously seen;
 refraining from sending the corresponding block to the server if the server answers that the hash value was previously sent by a second client; and
 adding the hash value to a list of hash values seen by the server;
 wherein operability of the client-server system containing the configured medium does not require that the server send the client any hash values for blocks which are not stored locally for the client.

23. A configured computer storage medium for causing a processor of a client to execute a method of processing blocks, the method comprising:
 calculating, using said processor of the client a hash value based on the content of a block;

determining that the hash value may not yet have been seen by a server; and processing the block;

wherein one of the following conditions exists:
(a) the determining step relies on a local hash table that has no corresponding server hash table, and blocks are processed locally when the client is disconnected from the server and then submitted to the server for processing when a connection to the server is reestablished; or
(b) the determining step relies on a local hash table that has a corresponding server hash table, namely, one that is updated to contain values found in the local hash table, and the processing step:

submits blocks to the server for processing when the client is connected to the server and when the blocks have not yet been seen by the server, but refrains from submitting the blocks to the server for processing when the server indicates that the blocks were previously sent to the server by a second client; and when the client is not connected refrains from processing the blocks locally but instead waits for a connection to be reestablished.

24. The configured computer storage medium of claim 23, wherein processing a block comprises saving a copy of the block in a single instance cluster store.

* * * * *

UNITED STATES PATENT AND TRADEMARK OFFICE
CERTIFICATE OF CORRECTION

PATENT NO.       : 7,600,125 B1                                       Page 1 of 1
APPLICATION NO. : 11/119449
DATED            : October 6, 2009
INVENTOR(S)      : Russell R. Stringham It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1195 days.

Signed and Sealed this

Fifth Day of October, 2010

David J. Kappos
*Director of the United States Patent and Trademark Office*